(12) United States Patent
Ahn et al.

(10) Patent No.: US 7,986,380 B2
(45) Date of Patent: Jul. 26, 2011

(54) LIQUID CRYSTAL DISPLAY OF HORIZONTAL ELECTRIC FIELD APPLYING TYPE AND FABRICATING METHOD THEREOF

(75) Inventors: Byung Chul Ahn, Ahnyang-shi (KR); Byoung Ho Lim, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 897 days.

(21) Appl. No.: 11/819,734

(22) Filed: Jun. 28, 2007

(65) Prior Publication Data

US 2007/0263166 A1    Nov. 15, 2007

Related U.S. Application Data

(62) Division of application No. 10/810,676, filed on Mar. 29, 2004, now Pat. No. 7,248,323.

(30) Foreign Application Priority Data

Mar. 29, 2003 (KR) .......... 10-2003-0019781
Mar. 29, 2003 (KR) .......... 10-2003-0019783
Apr. 3, 2003 (KR) .......... 10-2003-0021118

(51) Int. Cl.
*G02F 1/136* (2006.01)
*G02F 1/1343* (2006.01)

(52) U.S. Cl. .......... 349/43

(58) Field of Classification Search .......... 349/43, 349/141
See application file for complete search history.

(56) References Cited

U.S. PATENT DOCUMENTS

| | | | |
|---|---|---|---|
| 5,907,379 A | 5/1999 | Kim et al. | |
| 6,088,072 A | 7/2000 | Lee | |
| 6,259,502 B1 | 7/2001 | Komatsu | |
| 6,611,309 B2 | 8/2003 | Park et al. | |
| 6,704,085 B2 * | 3/2004 | Nishimura et al. | 349/141 |
| 6,888,585 B2 * | 5/2005 | Kim | 349/43 |
| 2001/0013915 A1 | 8/2001 | Song | |
| 2002/0036742 A1 | 3/2002 | Kimura et al. | |
| 2002/0051110 A1 | 5/2002 | Kim et al. | |
| 2002/0054247 A1 | 5/2002 | Hwang et al. | |
| 2003/0058396 A1 | 3/2003 | Shih | |
| 2005/0012150 A1 | 1/2005 | Byun et al. | |

FOREIGN PATENT DOCUMENTS

| | | |
|---|---|---|
| CN | 1246639 | 3/2000 |
| JP | 5-206468 | 8/1993 |
| JP | 6-296023 | 10/1994 |
| JP | 7-169967 | 7/1995 |
| JP | 11-202365 | 7/1999 |
| JP | 2000-039622 | 2/2000 |
| JP | 2000-250065 | 9/2000 |
| JP | 2000-250072 | 9/2000 |
| JP | 2001-264804 | 9/2001 |

(Continued)

*Primary Examiner* — James A Dudek

(74) *Attorney, Agent, or Firm* — McKenna Long & Aldridge LLP

(57) ABSTRACT

A liquid crystal display using horizontal electric field and a method of fabricating the liquid crystal display device that are capable of reducing the number of mask processes are provided.

The liquid crystal display of horizontal electric field applying type has a thin film transistor array substrate, with a conductive film connected to a gate pad, s data pad and a common pad of a thin film transistor on the substrate. The pads are exposed on the thin film transistor array substrate.

15 Claims, 38 Drawing Sheets

FOREIGN PATENT DOCUMENTS

| | | |
|---|---|---|
| JP | 2002-40479 | 2/2002 |
| JP | 2002-90779 | 3/2002 |
| KR | 1999-79262 | 11/1999 |
| KR | 1020000033515 A | 6/2000 |
| KR | 1020020076635 A | 10/2002 |

\* cited by examiner

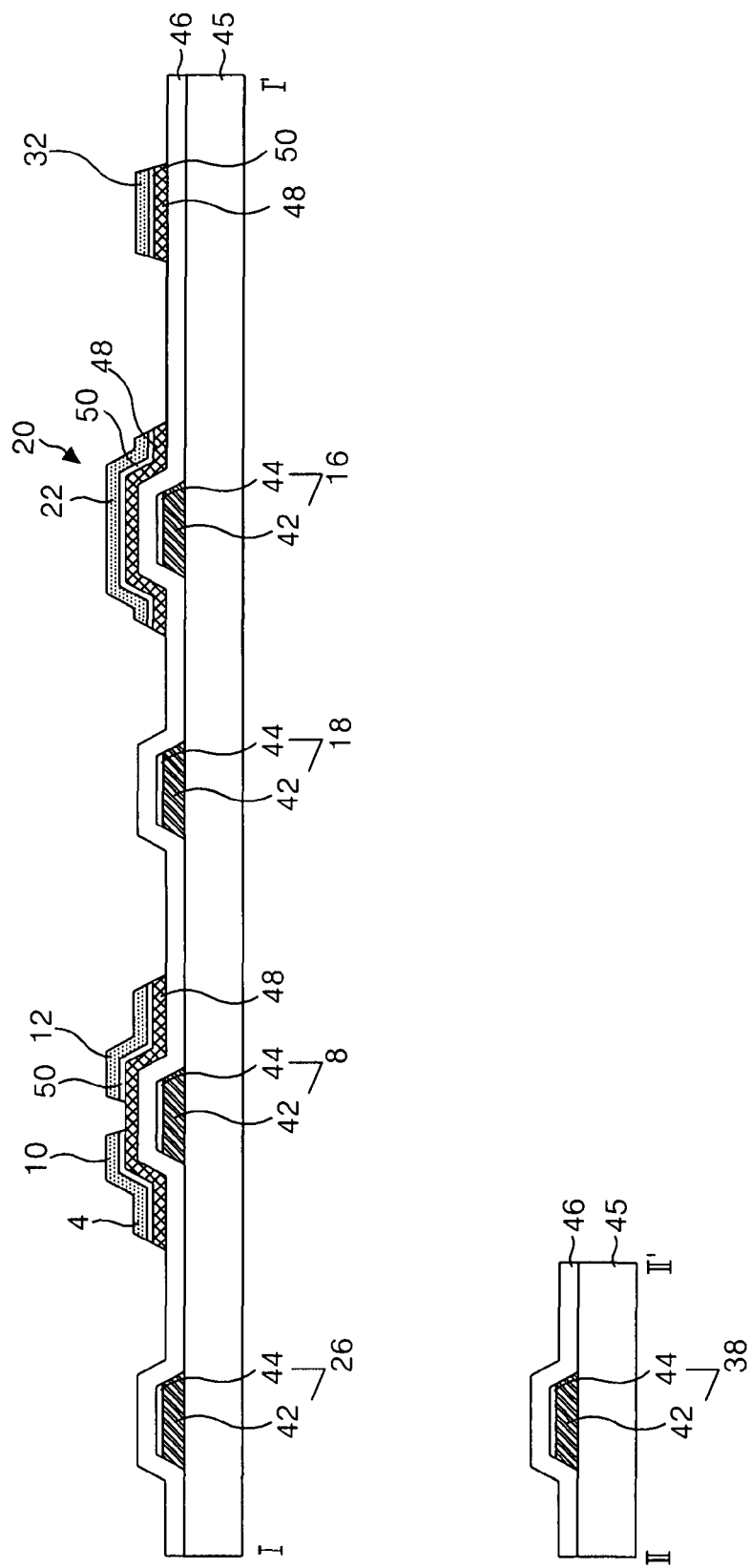

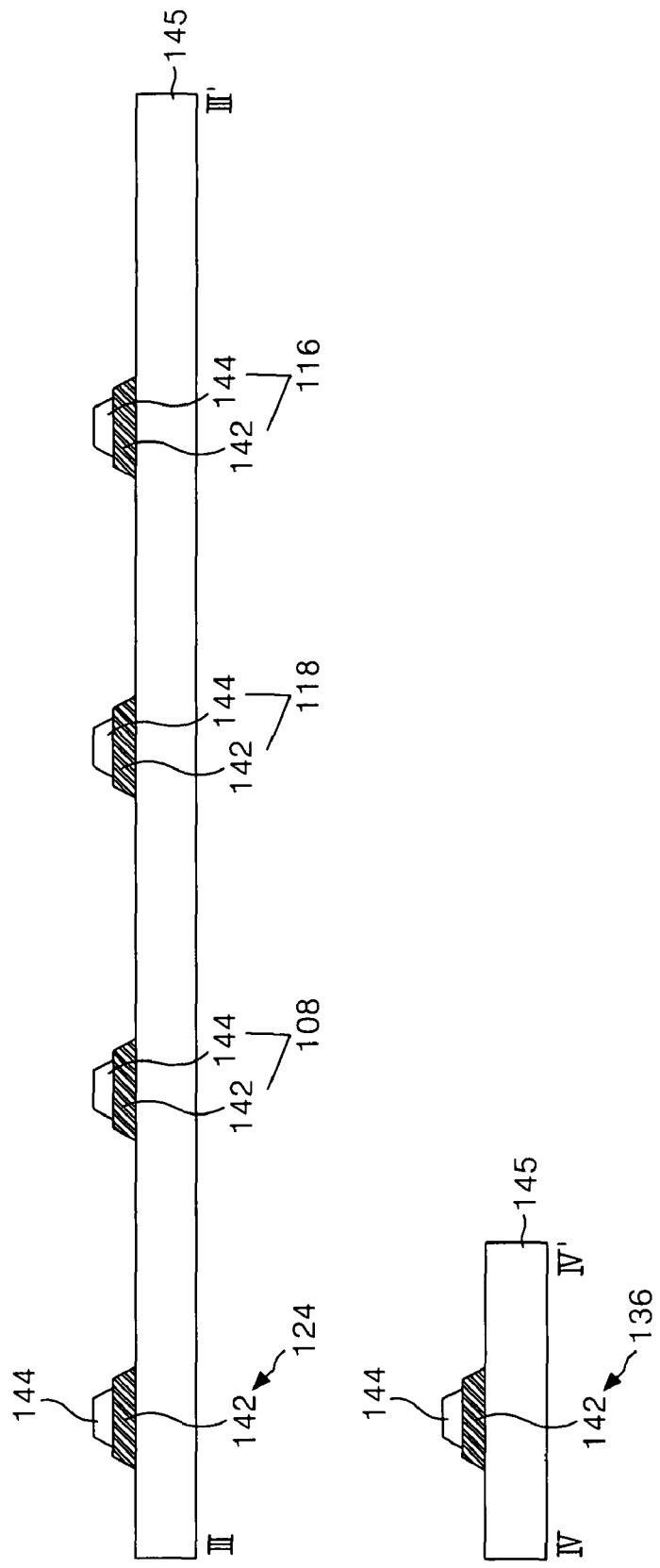

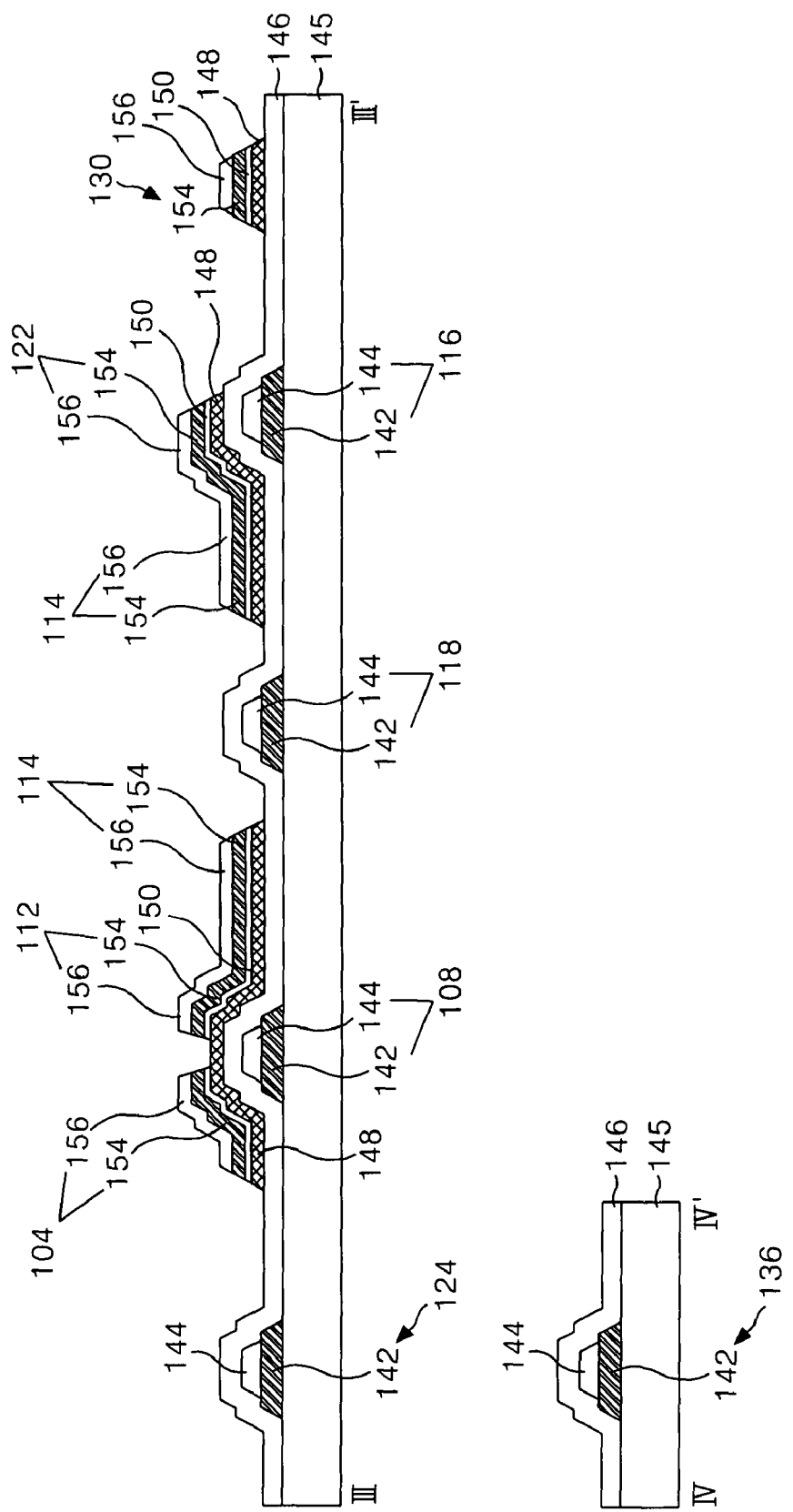

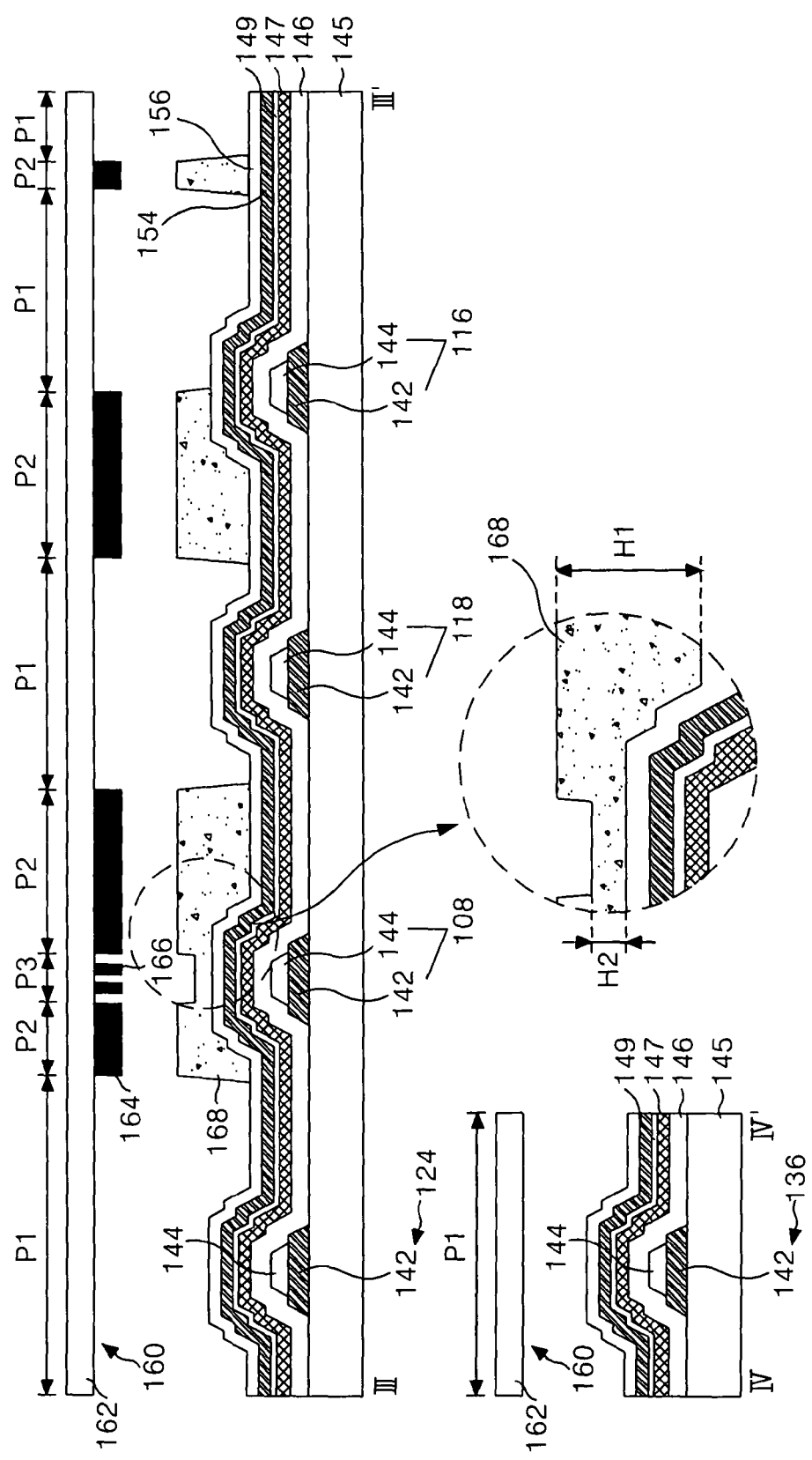

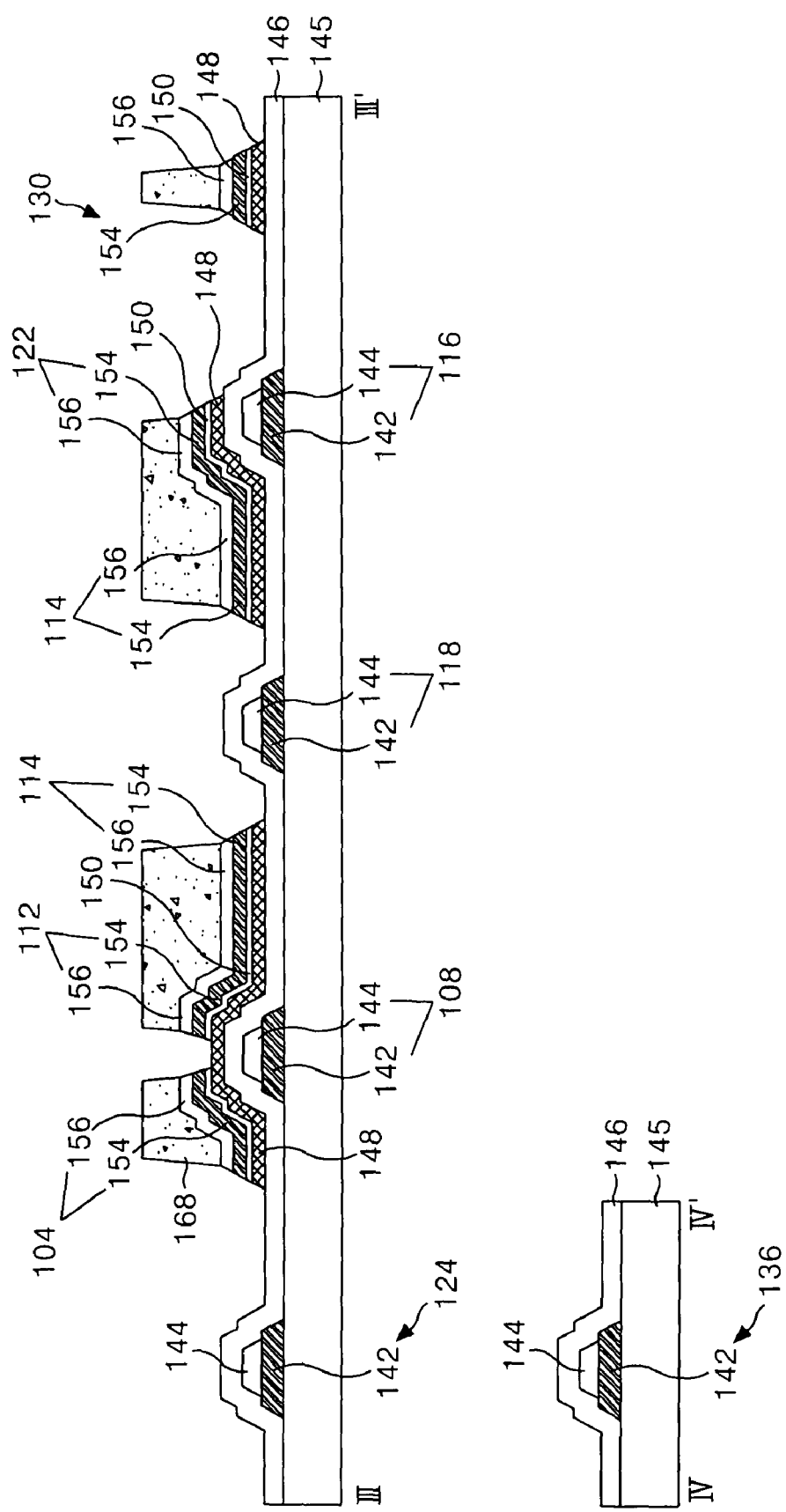

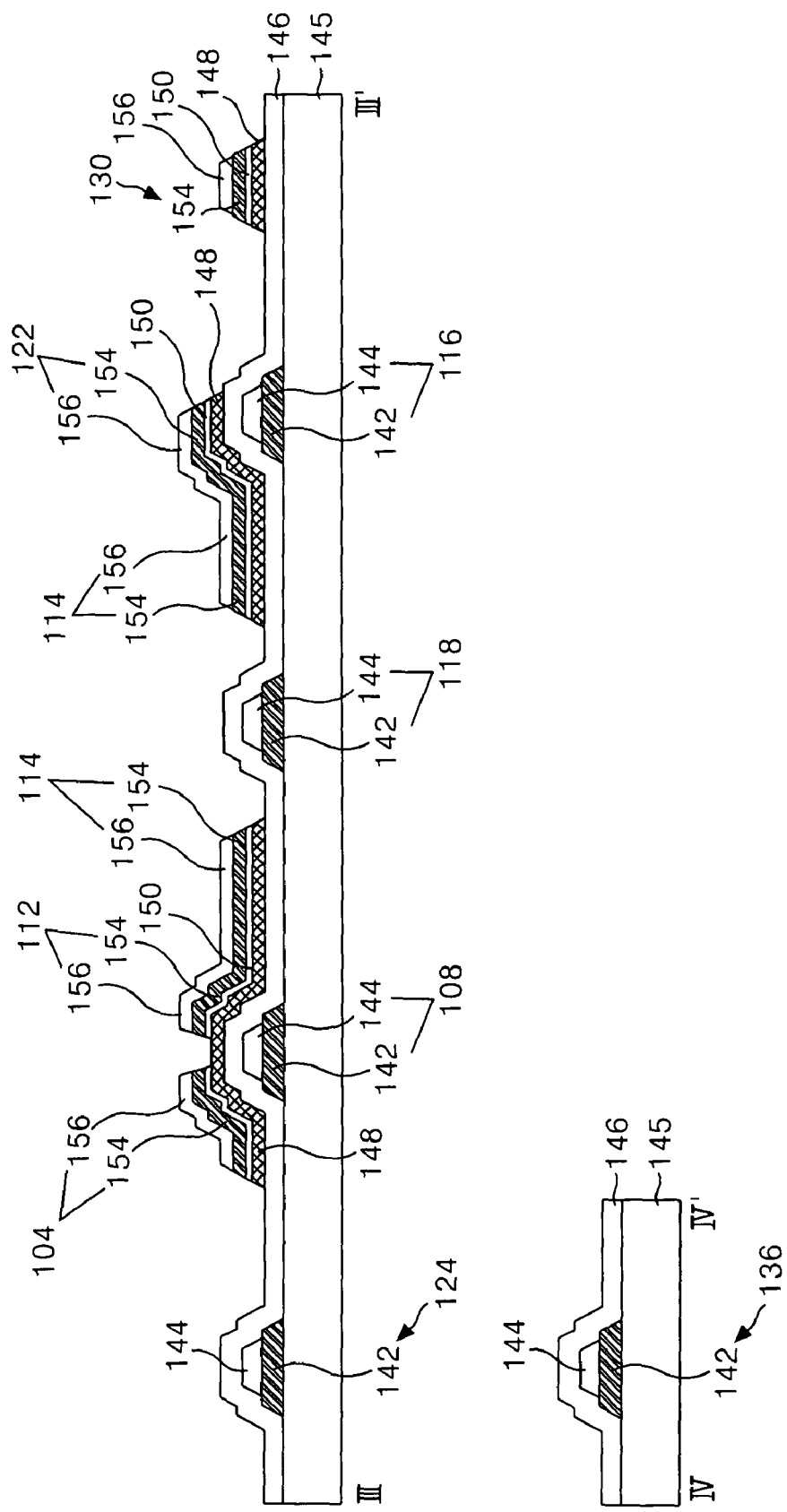

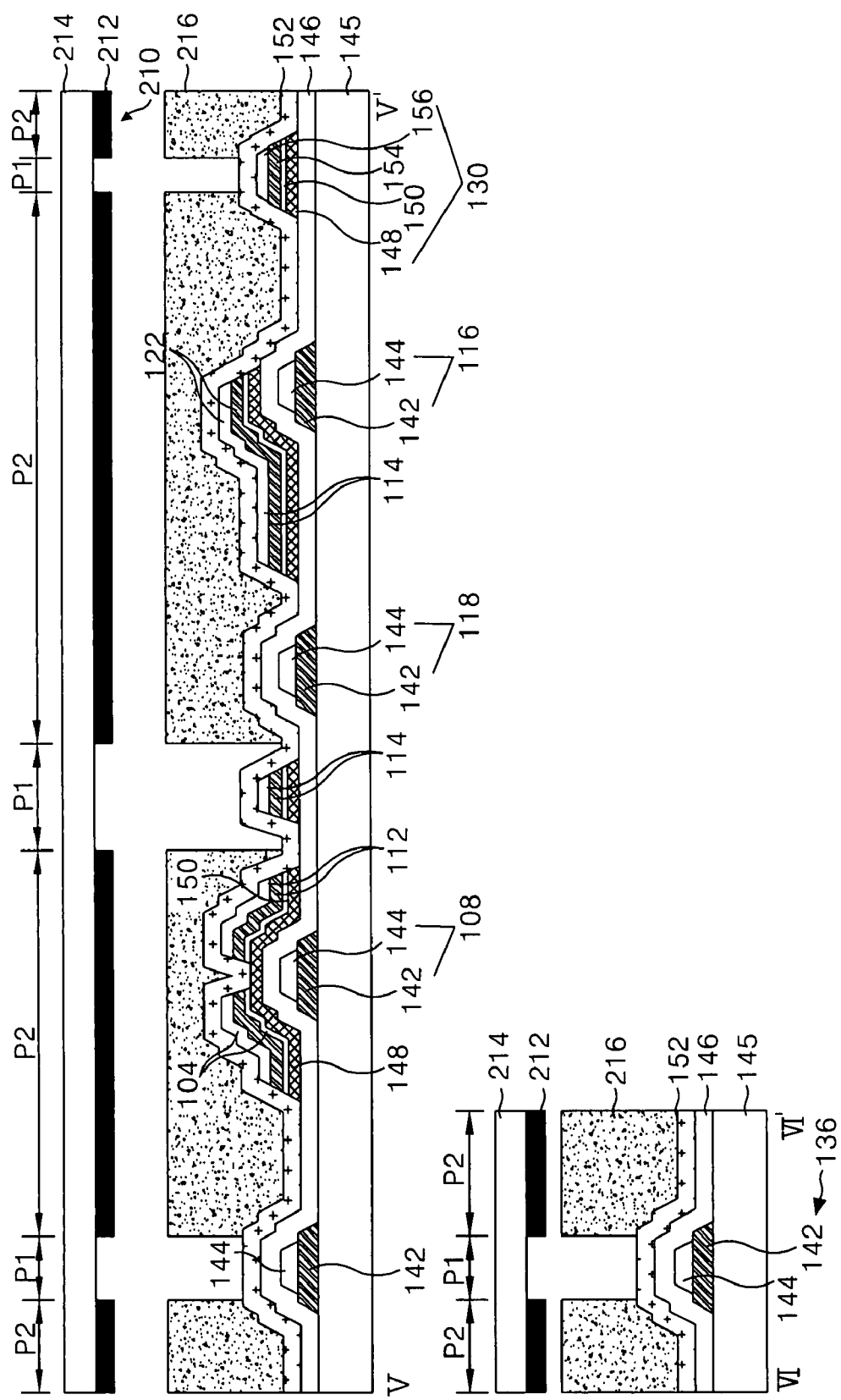

LIQUID CRYSTAL DISPLAY OF HORIZONTAL ELECTRIC FIELD APPLYING TYPE AND FABRICATING METHOD THEREOF

This application is a divisional of U.S. patent application Ser. No. 10/810,676 filed on Mar. 29, 2004, now U.S. Pat. No. 7,248,323 which claims the benefit of the Korea Patent Applications Nos. P03-19781, P03-19783 and P03-21118 filed on Mar. 29, 2003, Mar. 29, 2003 and Apr. 3, 2003, which are hereby incorporated by reference for all purposes as if fully set forth herein.

BACKGROUND OF THE INVENTION

1. Field of the Invention

The present invention relates to a liquid crystal display using a horizontal electric field, and more particularly to a liquid crystal display and a fabricating method thereof that are capable of reducing the number of mask processes.

2. Description of the Related Art

Generally, the liquid crystal displays (LCDs) control light transmittance of liquid crystal material using an electric field to thereby display a picture. The liquid crystal displays are classified into a vertical electric field type and a horizontal electric field type in accordance with a direction of the electric field driving the liquid crystal.

The liquid crystal display of vertical electric field type, in which a common electrode formed on an upper substrate and a pixel electrode formed on a lower substrate are arranged as facing each other, drives a liquid crystal of a twisted nematic mode (TN) by a vertical electric field formed between the common electrode and the pixel electrode. The liquid crystal display of vertical electric field type has an advantage of a large aperture ratio, while it has a defect of a narrow viewing angle of about 90°.

The liquid crystal display of a horizontal electric field type drives a liquid crystal in an in-plane switching (hereinafter referred to as "IPS") mode by a horizontal electric field between the pixel electrode and the common electrode disposed in parallel on the lower substrate. The liquid crystal display of horizontal electric field type has an advantage of a wide viewing angle about 160°. Hereinafter, the liquid crystal display of the horizontal electric field type will be described in detail.

The liquid crystal display of the horizontal electric field type comprises a thin film transistor array substrate (a lower substrate) and a color filter array substrate (an upper substrate) facing and joined to each other, a spacer for uniformly maintaining a cell gap between two substrates and a liquid crystal injected into a space provided by the spacer.

The thin film transistor array substrate includes a plurality of signal lines for forming a horizontal electric field on a basis of a pixel, a plurality of thin film transistors, an alignment film applied for a liquid crystal alignment thereon. The color filter array substrate includes a color filter for representing a color, a black matrix for preventing a light leakage and an alignment film applied for a liquid crystal alignment thereon.

In such a liquid crystal display, since the manufacture of a thin film transistor array substrate involves a semiconductor process and requires a plurality of mask processes, the complexity of the manufacturing process is a major factor raising the manufacturing cost of the liquid crystal display panel. In order to solve this, the thin film transistor array substrate has been developed to reduce the number of mask processes. This is because one mask process may include a lot of processes such as thin film deposition, cleaning, photolithography, etching, photo-resist stripping and inspection processes, to name a few. Recently, there has been highlighted a four-step mask process in which one mask process is reduced from the five-step mask process that is employed related art.

FIG. 1 is a plan view illustrating a related art thin film transistor substrate of a horizontal electric type using the four-step mask process, and FIG. 2 is a sectional view of the thin film transistor array substrate taken along the I-II' and II-II' line in FIG. 1.

Referring to FIGS. 1 and 2, the related art thin film transistor array substrate of the horizontal electric type comprises a gate line 2 and a data line 4 formed crossing each other on a lower substrate 45, a thin film transistor 6 formed at each crossing, a pixel electrode 14 and a common electrode 18 formed in order to apply the horizontal electric field in a pixel region defined by the interconnection part and a common line 16 connected to the common electrode 18. Further, the related art thin film transistor array substrate comprises a storage capacitor 20 formed at an overlapped portion between the pixel electrode 14 and the common line 16, a gate pad 24 connected to the gate line 2, and a data pad 30 connected to the data line 4 and a common pad 36 connected to the common line 16.

The gate line 2 supplies a gate signal to the gate electrode 8 of the thin film transistor 6. The data line 4 supplies a pixel signal to the pixel electrode 14 via a drain electrode 12 of the thin film transistor 6. The gate line 2 and the data line 4 are formed in an intersection structure to thereby define the pixel region 5.

The common line 16 is formed in parallel with the gate line 2 with the pixel region 5 positioned between the common line 16 and the gate line 2 to supply a reference voltage for driving the liquid crystal to the common electrode 18.

The thin film transistor 6 responds to the gate signal of the gate line 2 so that the pixel signal of the data line 4 is charged to the pixel electrode 14. To this end, the thin film transistor 6 comprises a gate electrode 8 connected to the gate line 2, a source electrode 10 connected to the data line 4 and a drain electrode 12 connected to the pixel electrode 14. Further, the thin film transistor 6 includes an active layer 48 overlapping with the gate electrode 8 with a gate insulating film 46 positioned between the thin film transistor 6 and the gate electrode 8 and defining a channel between the source electrode 10 and the drain electrode 12. The active layer 48 is formed to overlap with the data line 4, a data pad lower electrode 32 and a storage electrode 22. On the active layer 48, an ohmic contact layer 50 making an ohmic contact with the data line 4, the source electrode 10, the drain electrode 12, the data pad lower electrode 32 and the storage electrode 22 is further formed.

The pixel electrode 14, which is connected to the drain electrode 12 of the thin film transistor 6 via a first contact hole 13 passing through a passivation film 52, is formed in the pixel region 5. In particular, the pixel electrode 14 comprises a first horizontal part 14A connected to the drain electrode 12 and formed in parallel with adjacent gate line 2 and a second horizontal part 14B formed to overlap with the common line 16 and a finger part 14C formed in parallel with the common electrode 18.

The common electrode 18 is connected to the common line 16 and is formed in the pixel region 5. In addition, the common electrode 18 is formed in parallel with the finger part 14C of the pixel electrode 14 in the pixel region 5.

Accordingly, a horizontal electric field is formed between the pixel electrode 14 to which the pixel signal is supplied via the thin film transistor 6 and the common electrode 18 to which the reference voltage is supplied via the common line 16. Moreover, the horizontal electric field is formed between the finger part 14C of the pixel electrode 14 and the common electrode 18. The liquid crystal molecules arranged in the horizontal direction between the thin film transistor array substrate and the color filter array substrate by the horizontal electric field rotate due to a dielectric anisotropy. The light transmittance transmitting the pixel region 5 differs according to the amount of rotation of the liquid crystal molecules and thereby the pictures can be produced.

The storage capacitor 20 consists of the common line 16, a storage electrode 22 overlapping with the common line 16, with the gate insulating film 46, the active layer 48 and the ohmic contact layer 50 positioned therebetween, and a pixel electrode 14 connected via a second contact hole 21 passing through the storage electrode 22 and the passivation film 52. The storage capacitor 20 allows a pixel signal charged in the pixel electrode 14 to be stably maintained until the next pixel signal is charged.

The gate line 2 is connected, via the gate pad 24, to a gate driver (not shown). The gate pad 24 consists of a gate pad lower electrode 26 extending from the gate line 2, and a gate pad upper electrode 28 connected to the gate pad lower electrode 26 via a third contact hole 27 passing through the gate insulating film 46 and the passivation film 52.

The data line 4 is connected, via the data pad 30, to the data driver (not shown). The data pad 30 consists of a data pad lower electrode 32 extended from the data line 4, and a data pad upper electrode 34 connected, via a fourth contact hole 33 passing through the passivation film 52, to the data pad lower electrode 32.

The common line 16 is supplied with the reference voltage from the exterior reference voltage source (not shown) via the common pad 36. The common pad 36 consists of a common pad lower electrode 38 extended from the common line 16, and a common pad upper electrode 40 connected, via a fifth contact hole 39 passing through the gate insulating film 46 and the passivation film 52, to the common pad lower electrode 38.

A method of fabricating the thin film transistor substrate having the above-mentioned structure using the four-step mask process will be described in detail with reference to FIGS. 3A to 3D.

Referring to FIG. 3A, a first conductive pattern group including the gate line 2, the gate electrode 8 and the gate pad lower electrode 26 is formed on the lower substrate 45 using the first mask process.

More specifically, a first metal layer 42 and a second metal layer 44 are sequentially formed on the upper substrate 45 by a deposition technique such as sputtering to form a gate metal layer of double-structure. Then, the gate metal layer is patterned by the photolithography and the etching process using a first mask to thereby form the first conductive pattern group including the gate line 2, the gate electrode 8, the gate pad lower electrode 26, the common line 16, common electrode 18 and the common pad lower electrode 38. Herein, the first metal layer 42 is formed with an aluminum system metal and the second metal layer 44 is formed with chrome (Cr) or molybdenum (Mo).

Referring to FIG. 3B, the gate insulating film 46 is formed on the lower substrate 45 provided with the first conductive pattern group. Further, a semiconductor pattern group including the active layer 48 and the ohmic contact layer 50 and a second conductive pattern group including the data line 4, the source electrode 10, the drain electrode 12, the data pad lower electrode 32 and the storage electrode 22 are formed on the gate insulating film 46 using the second mask process.

More specifically, the gate insulating film 46, a first semiconductor layer, a second semiconductor layer and a data metal layer are sequentially formed on the lower substrate 45 provided with the first conductive pattern group by deposition techniques such as plasma enhanced chemical vapor deposition (PECVD) and the sputtering, etc. Herein, the gate insulating film 46 is made of an inorganic insulating material such as silicon oxide (SiOx) or silicon nitride (SiNx). The first semiconductor layer is made of undoped amorphous silicon and the second conductor layer is made of amorphous silicon doped with an impurity of a N type or P type. The data metal layer is made of molybdenum (Mo), titanium (Ti), tantalum (Ta) or molybdenum alloy, etc.

A photo-resist pattern is formed on the data metal layer by the photolithography using a second mask. In this case, a diffractive exposure mask having a diffractive exposing part at a channel portion of the thin film transistor is used as a second mask, thereby allowing a photo-resist pattern of the channel portion to have a lower height than other photo-resist patterns of region portions.

Subsequently, the data metal layer is patterned by a wet etching process using the other photo-resist patterns to thereby provide the data pattern that included the data line 4, the source electrode 10, the drain electrode 12 being integral to the source electrode 10 and the storage electrode 22.

Next, the first semiconductor layer and the second semiconductor layer are patterned at the same time by a dry etching process using the same photo-resist pattern to thereby provide the ohmic contact layer 50 and the active layer 48.

The photo-resist pattern having a relatively low height is removed from the channel portion by the ashing process and thereafter the source electrode, the drain electrode and the ohmic contact layer 50 of the channel portion are etched by the dry etching process. Thus, the active layer 48 of the channel portion is exposed to separate the source electrode 10 from the drain electrode 12.

A remainder of the photo-resist pattern on the second conductive pattern group is removed using the stripping process.

Referring to FIG. 3C, the passivation film 52 including first to fifth contact holes 13, 21, 27, 33 and 39 are formed on the gate insulating film 46 provided with the second conductive pattern group using the third mask process.

More specifically, the passivation film 52 is entirely formed on the gate insulating film 46 provided with the data pattern by a deposition technique such as the plasma enhanced chemical vapor deposition (PECVD). The passivation film 52 is patterned by the photolithography and the etching process using the third mask to thereby form first to fifth contact holes 13, 21, 27, 33 and 39. The first contact hole 13 is formed in such a manner as to pass through the passivation film 52 and expose the drain electrode 12, whereas the second contact hole 21 is formed in such a manner as to pass through the passivation film 52 and expose the storage electrode 22. The third contact hole 27 is formed in such a manner as to pass through the passivation film 52 and the gate insulating film 46 and expose the gate pad lower electrode 26. The fourth contact hole 33 is formed in such a manner as to pass through the passsivation film 52 and exposes the data pad lower electrode 32. The fifth contact hole 39 is formed in such a manner as to pass through the passivation film 52 and the gate insulating film 46 and expose the common pad lower electrode 38. Herein, when a metal which has high ratio of dry etching like molybdenum (Mo) is used for the data metal, the first contact hole 13, the second contact hole 21 and the forth contact hole 33 are formed in such a manner as to pass through to the drain electrode 12, the storage electrode 22 and the data pad lower electrode 32, respectively, to thereby expose their side.

The passivation film 52 is made of an inorganic insulating material such as the gate insulating film 46 or an organic insulating material having a small dielectric constant such as an acrylic organic compound, BCB (benzocyclobutene) or PFCB (perfluorocyclobutane), etc.

Referring to FIG. 3D, a third conductive pattern group including the pixel electrode 14, the gate pad upper electrode 28, the data pad upper electrode 34 and the common pad upper electrode 40 is formed on the passivation film 52 using the fourth mask process.

More specifically, a transparent conductive film is coated onto the passivation film 52 by a deposition technique such as sputtering, etc. Then, the transparent conductive film is patterned by the photolithography and the etching process using a fourth mask, to thereby provide the third conductive pattern group including the pixel electrode 14, the gate pad upper electrode 28, the data pad upper electrode 34 and the common pad upper electrode 40. The pixel electrode 14 is electrically connected, via the first contact hole 13, to the drain electrode 12 while being electrically connected, via the second contact hole 21, to the storage electrode 22. The gate pad upper electrode 28 is electrically connected, via the third contact hole 37, to the gate pad lower electrode 26. The data pad upper electrode 34 is electrically connected, via the fourth contact hole 33, to the data pad lower electrode 32. The common pad upper electrode 40 is electrically connected, via the fifth contact hole 39, to the common pad lower electrode 38.

In this connection, the transparent conductive film may be made of indium-tin-oxide (ITO), tin-oxide (TO), indium-zinc-oxide (IZO) or indium tin zinc oxide (ITZO).

As described above, the related art thin film transistor array substrate of the horizontal electric field type and the manufacturing method thereof adopts a four-round mask process, thereby reducing the number of manufacturing processes in comparison to the five-round mask process and hence reducing a manufacturing cost to that extent. However, since the four-round mask process still has a complex manufacturing process and limited cost reduction an approach is needed that is capable of further simplifying the manufacturing process and further reducing the manufacturing cost.

SUMMARY OF THE INVENTION

Accordingly, the present invention is directed to a liquid crystal display that substantially obviates one or more of the problems due to limitations and disadvantages of the related art.

Accordingly, it is an advantage of the present invention to provide a liquid crystal display using a horizontal electric field and a method of fabricating a liquid crystal display device that is capable of reducing the number of mask processes.

In order to achieve these and other advantages of the invention, a liquid crystal display of horizontal electric field applying type according to the present invention comprises: a thin film transistor array substrate, wherein the thin film transistor array substrate includes a gate line, a common line parallel to the gate line, a data line crossing with the gate line and the common line with a gate insulating film therebetween to define a pixel area, a thin film transistor formed on each intersection of the gate line and the data line, a common electrode formed in the pixel area and connected to the common line, a pixel electrode connected to the thin film transistor and formed to produce horizontal electric field along with the common electrode in the pixel area, a gate pad formed with at least one conductive layer included in the gate line, a data pad formed with at least one conductive layer included in the data line, a common pad formed with at least one conductive layer included in the common line and a passivation film exposing the gate pad, the data pad and the common pad, which are formed on a substrate to form the thin film transistor array substrate; a color filter array combined with the thin film transistor array substrate, liquid crystal materials being filled between the color filter and the thin film transistor array substrate; and a conductive film connected to the gate pad, the data pad and the common pad which are exposed on the thin film transistor array substrate.

Each of the gate line and the common line includes a main conductive layer and a subsidiary conductive layer for providing against opening of the main conductive layer.

Each of the gate pad and the common pad comprise the main conductive layer and the subsidiary conductive layer, wherein the subsidiary conductive layer has an exposed structure.

Each of the gate pad and the common pad comprises a subsidiary conductive layer.

The main conductive layer includes at least one of an aluminum system metal, copper, molybdenum, chrome and tungsten which are a low resistance metal, and wherein the subsidiary conductive layer includes titanium.

The data line includes a main conductive layer and a subsidiary conductive layer for providing against the opening of the main conductive layer.

Each of the data pad includes the main conductive layer and the subsidiary conductive layer, wherein the subsidiary conductive layer has an exposed structure.

The data pad includes the subsidiary conductive layer.

The main conductive layer includes at least one of an aluminum system metal, copper, molybdenum, chrome and tungsten which are a low resistance metal, and wherein the subsidiary conductive layer includes titanium.

The liquid crystal display of horizontal electric field applying type further comprises an etching preventive layer for preventing the substrate from being etched.

The etching preventive layer includes a transparent oxide system material, which is strong against the etchant of hydrofluoric acid HF system.

The etching preventive layer includes any one of $TiO_2$ and $Al_2O_3$.

The thin film transistor comprises: a gate electrode connected to the gate line; a source electrode connected to the data line; a drain electrode opposite to the source electrode; and a semiconductor layer overlapped with the gate electrode with the gate insulating film therebetween to form a channel portion between the source electrode and the drain electrode.

The drain electrode and the pixel electrode are made of an identical conductive layer.

The liquid crystal display of horizontal electric field applying type further comprises a storage capacitor, wherein the storage capacitor has a lower storage electrode formed by a portion of the common line and an upper storage electrode which is formed to overlap with the lower storage electrode and made of a conductive layer identical to that of the pixel electrode.

The semiconductor layer is formed on the gate insulating film along the data line, the source electrode, the drain electrode, the pixel electrode and the upper storage electrode.

The pixel electrode includes: a finger part formed in parallel with the common electrode to produce the horizontal electric field along with the common electrode; and a horizontal part connected to the finger part and formed in parallel with the gate line.

The semiconductor layer is formed to have a width identical to that of the finger part of the pixel electrode.

The liquid crystal display of horizontal electric field applying type further comprises a passivation film for exposing the gate pad, the data pad, the common pad and the pixel electrode.

In order to achieve these and other objects of the invention, a method for fabricating a liquid crystal display of horizontal electric field applying type includes: preparing a thin film transistor array substrate, wherein the thin film transistor array substrate includes a thin film transistor formed on an intersection of a gate line and a data line, a pixel electrode connected to the thin film transistor, a common electrode producing horizontal electric field along with the pixel electrode and a common line connected to the common electrode and wherein the thin film transistor array substrate has a gate pad formed with at least one conductive layer included in the gate line, a data pad formed with at least one conductive layer included in the data line and a common pad formed with at least one conductive layer included in the common line which are exposed through a passivation film; preparing a color filter array substrate to be opposite to the thin film transistor array substrate; combining the thin film array substrate and the color filter array substrate; and connecting a conductive film to the gate pad, the data pad and the common pad.

The step of preparing a thin film transistor array substrate includes: forming on a substrate a first conductive pattern group having the gate line, a gate electrode of the thin film transistor, the common line parallel to the gate line, the common electrode, the gate pad and the common pad; forming a gate insulating film on the substrate having the first conductive pattern group thereon; forming a second conductive pattern group and a semiconductor layer having a channel of the thin film transistor and forming along the second conductive pattern group, wherein the second conductive pattern group have the data line, a source electrode of the thin film transistor connected to the data line, a drain electrode of the thin film transistor being opposite to the source electrode, a pixel electrode connected to the drain electrode and paralleled to the common electrode and the data pad; and forming a passivation film for exposing the gate pad, the data pad and the common pad on the gate insulation film having the second conductive pattern group and the semiconductor layer formed thereon.

Any one of the first and the second conductive pattern groups is formed to have a double-layer structure having a main conductive layer and a subsidiary conductive layer for providing against the opening of the main conductive layer.

The step of forming the passivation film includes exposing subsidiary layers of the gate pad and the common pad.

The step of forming the passivation film includes forming a contact hole passing through the passivation film and the gate insulation film to expose subsidiary layers of the gate pad and the common pad.

The step of forming the passivation film includes forming a contact hole passing through the passivation film, the gate insulation film and main layers of the gate pad and the common pad to expose subsidiary layers of the gate pad and the common pad.

The step of forming the passivation film includes exposing a subsidiary layer of the data pad.

The step of forming the passivation film includes forming a contact hole passing through the passivation film to expose a subsidiary layer of the data pad.

The step of forming the passivation film includes forming a contact hole passing through the passivation film and a main layer of the data pad to expose a subsidiary layer of the data pad.

The main layer includes at least one of an aluminum system metal, a copper, a molybdenum, a chrome and a tungsten which are a low resistance metal, and wherein the subsidiary layer includes a titanium.

The step of forming the second conductive pattern group further includes forming an upper storage electrode overlapped with the common line with the gate insulating film therebetween.

The step of preparing the thin film transistor array substrate further includes: preparing a substrate; and forming an etching preventive layer on the substrate.

The etching preventive layer includes a transparent oxide system material, which is strong against the etchant of hydrofluoric acid HF system.

The etching preventive layer includes any one of $TiO_2$ and $Al_2O_3$.

The step of preparing the thin film transistor array substrate includes: forming on a substrate a first conductive pattern group having the gate line, a gate electrode of the thin film transistor connected to the gate line, the common line parallel to the gate line, the common electrode, the gate pad and the common pad; forming a gate insulating film on the substrate having the first conductive pattern group thereon; forming the data line, a source electrode of the thin film transistor connected to the data line, a drain electrode of the thin film transistor opposite to the source electrode, a pixel electrode formed with at least one conductive layer included in the drain electrode and having a finger part to form a horizontal electric field along with the common electrode, a second conductive pattern group including the data pad and a semiconductor layer forming a channel portion of the thin film transistor and overlapped with the pixel electrode; forming a passivation film on the gate insulating film so as to cover the semiconductor layer and the second conductive pattern group; and patterning the semiconductor layer so that the finger part of the pixel electrode is formed to have a width identical to that of the pixel electrode.

The step of forming the passivation film includes: forming a contact hole passing through the passivation film to expose a subsidiary layer of the data pad, and forming a contact hole passing through the passivation film and the gate insulating film to expose the semiconductor layer being overlapped with a subsidiary conductive layer of the pixel electrode and the pixel electrode.

The step of forming the passivation film includes: forming a contact hole passing through the passivation film and the main conductive layer to expose a subsidiary conductive layer of the data pad, and forming a contact hole passing through the passivation film, the gate insulating film and the main conductive layer to expose the semiconductor layer being overlapped with a subsidiary conductive layer of the pixel electrode and the pixel electrode.

The step of patterning the semiconductor layer includes dry-etching the semiconductor layer using a mask, the pixel electrode being employed as the mask.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A to 3D are sectional views sequentially illustrating a method of manufacturing the thin film transistor array substrate shown in FIG. 2;

FIG. 6A and FIG. 6B are a plan view and a sectional view illustrating a first mask process among a manufacturing method of a thin film transistor array substrate according to a first embodiment of the present invention, respectively;

FIGS. 8A to 8E are sectional views illustrating the second mask process among the manufacturing method of a thin film transistor array substrate according to the first embodiment of the present invention;

FIGS. 20A to 20D are sectional views illustrating the third mask process among the manufacturing method of a thin film transistor array substrate according to the third embodiment of the present invention;

DETAILED DESCRIPTION OF THE PREFERRED EMBODIMENT

Reference will now be made in detail to an embodiment of the present invention, example of which is illustrated in the accompanying drawings.

Hereinafter, exemplary embodiments of the present invention will be described in detail with reference to FIGS. 4 to 24.

Figure 1:
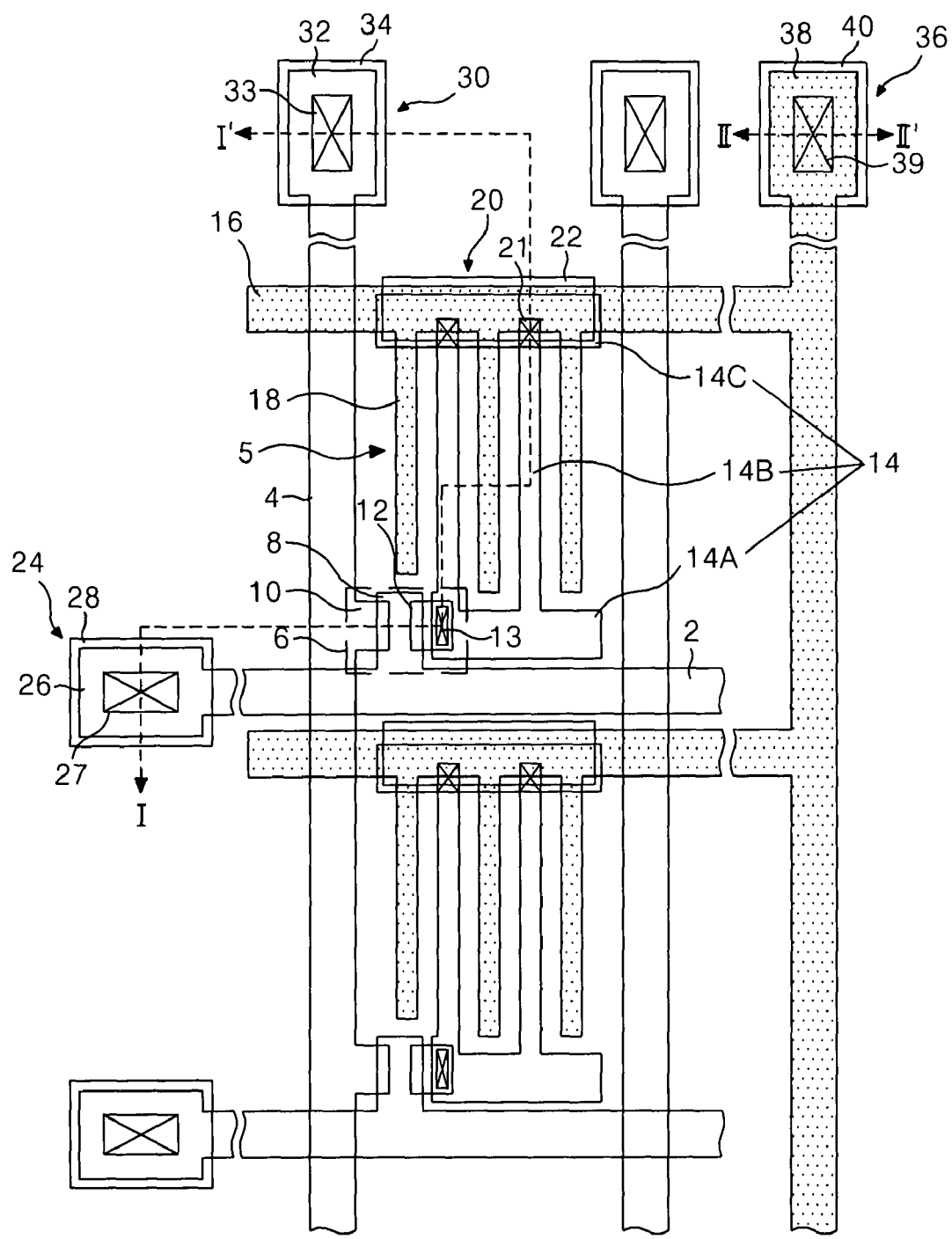
FIG. 1 is a plan view illustrating the related art thin film transistor array substrate of liquid crystal display of horizontal electric applying type.
Figure 2:
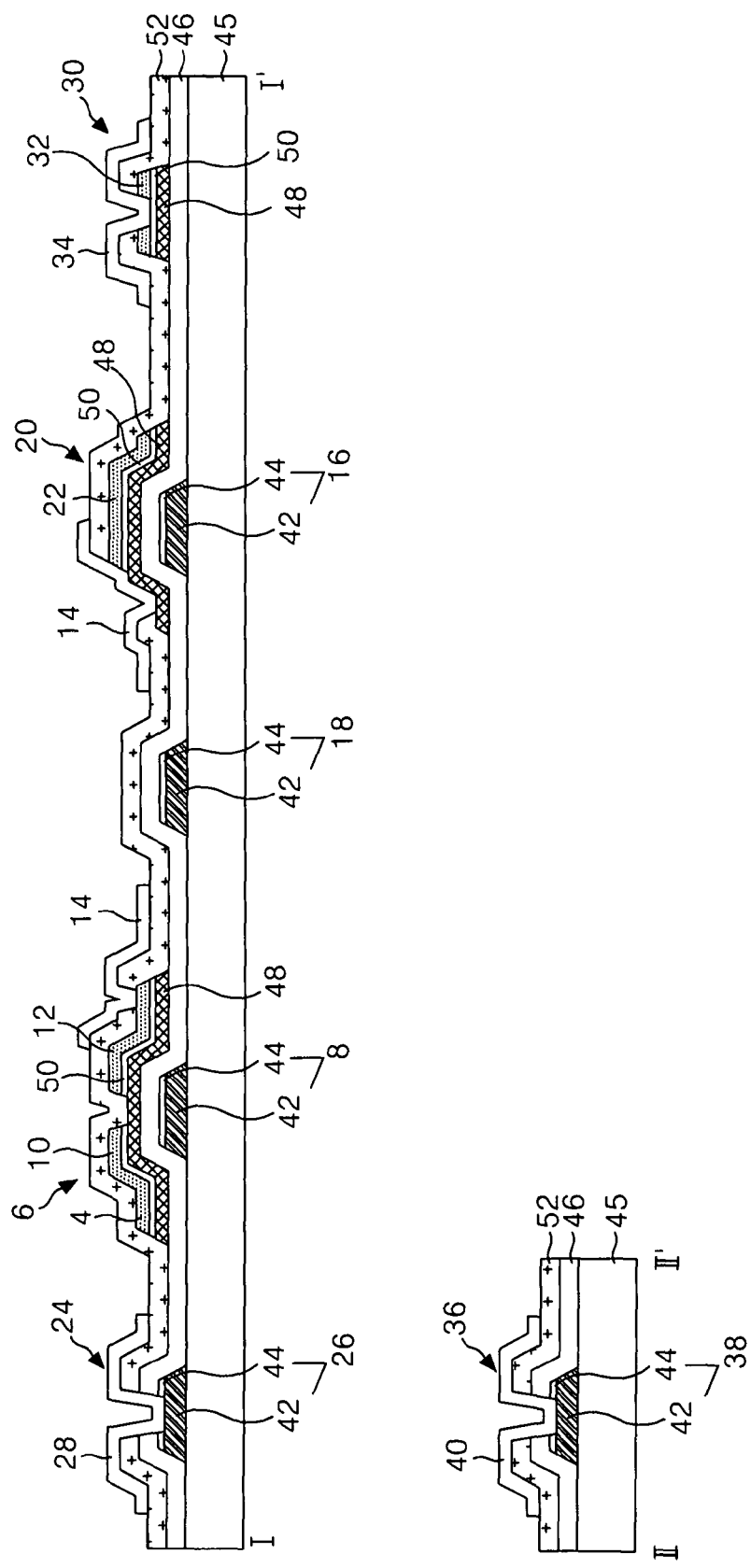
FIG. 2 is a sectional view of the thin film transistor array substrate taken along the lines I-I' and II-II' in FIG. 1.
Figure 3A:
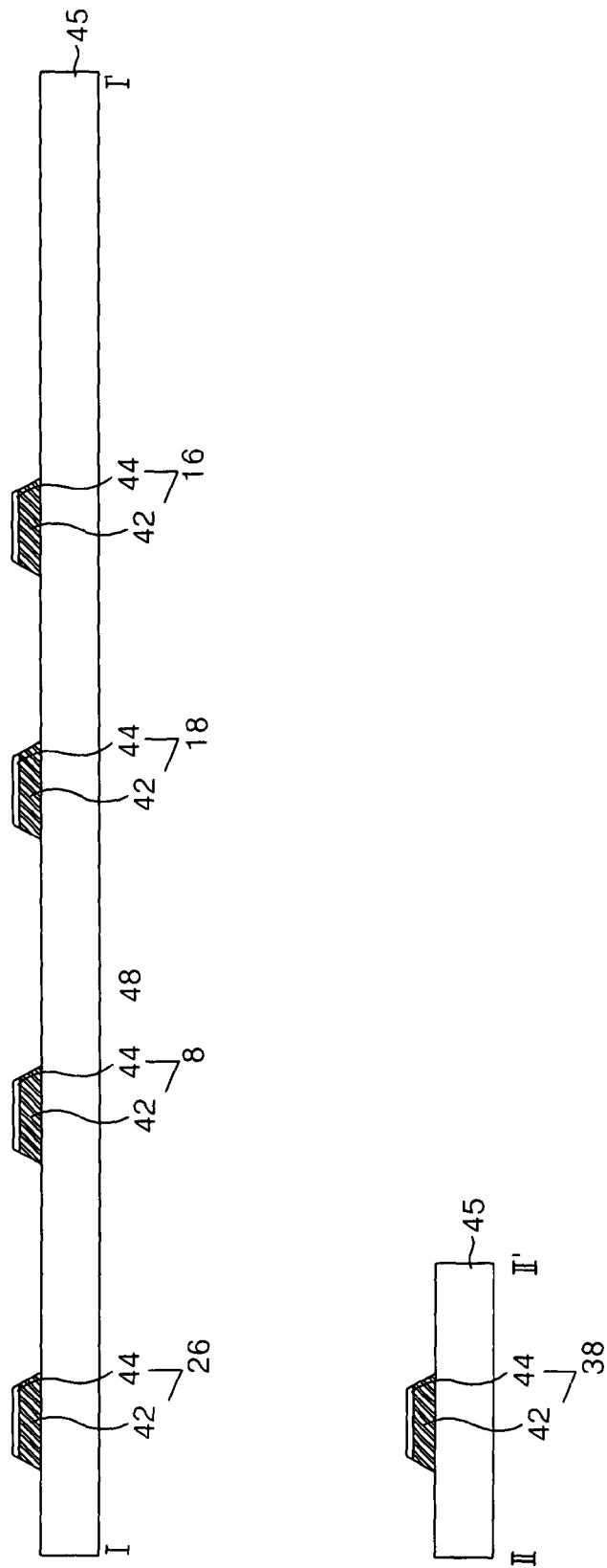
Figure 3C:
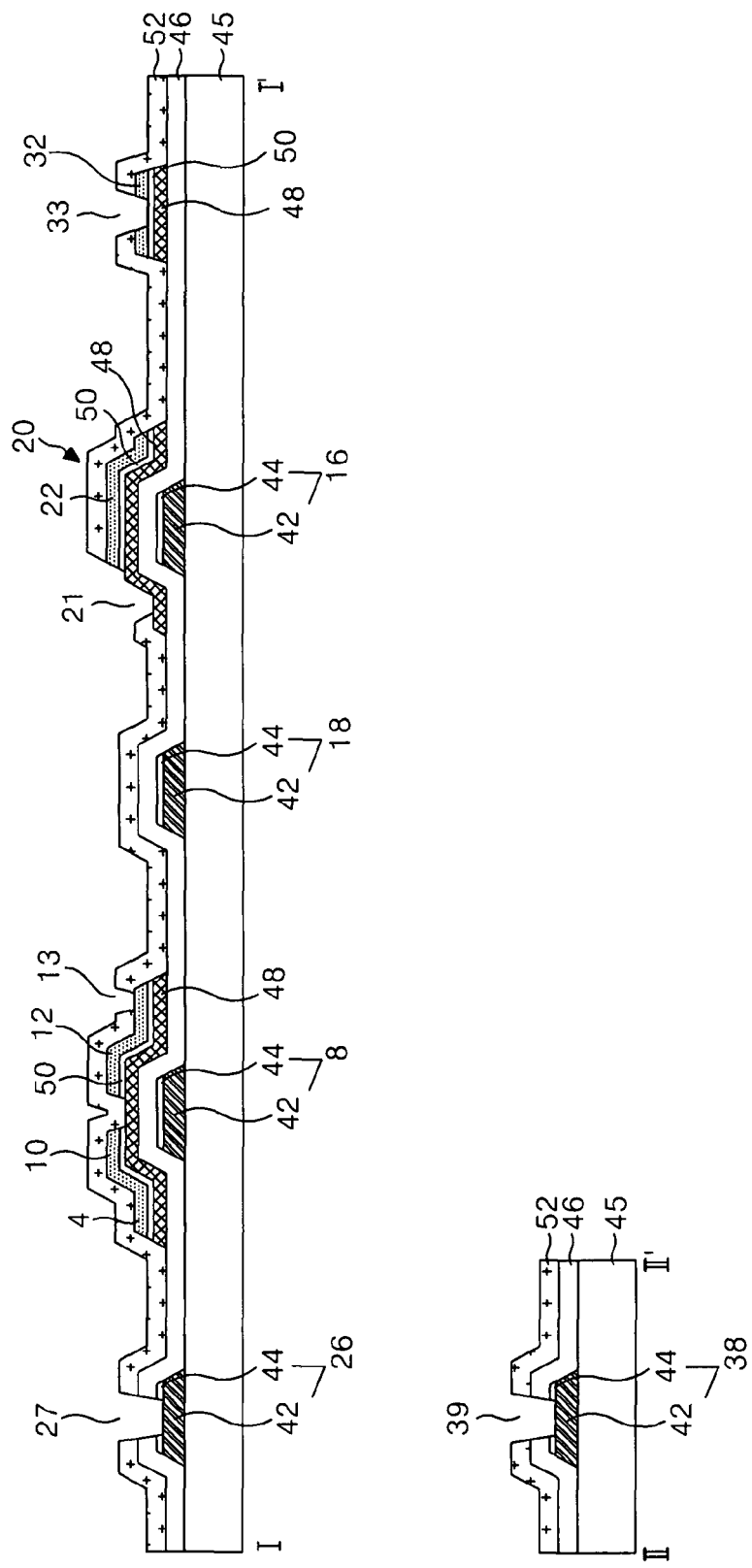
Figure 3D:
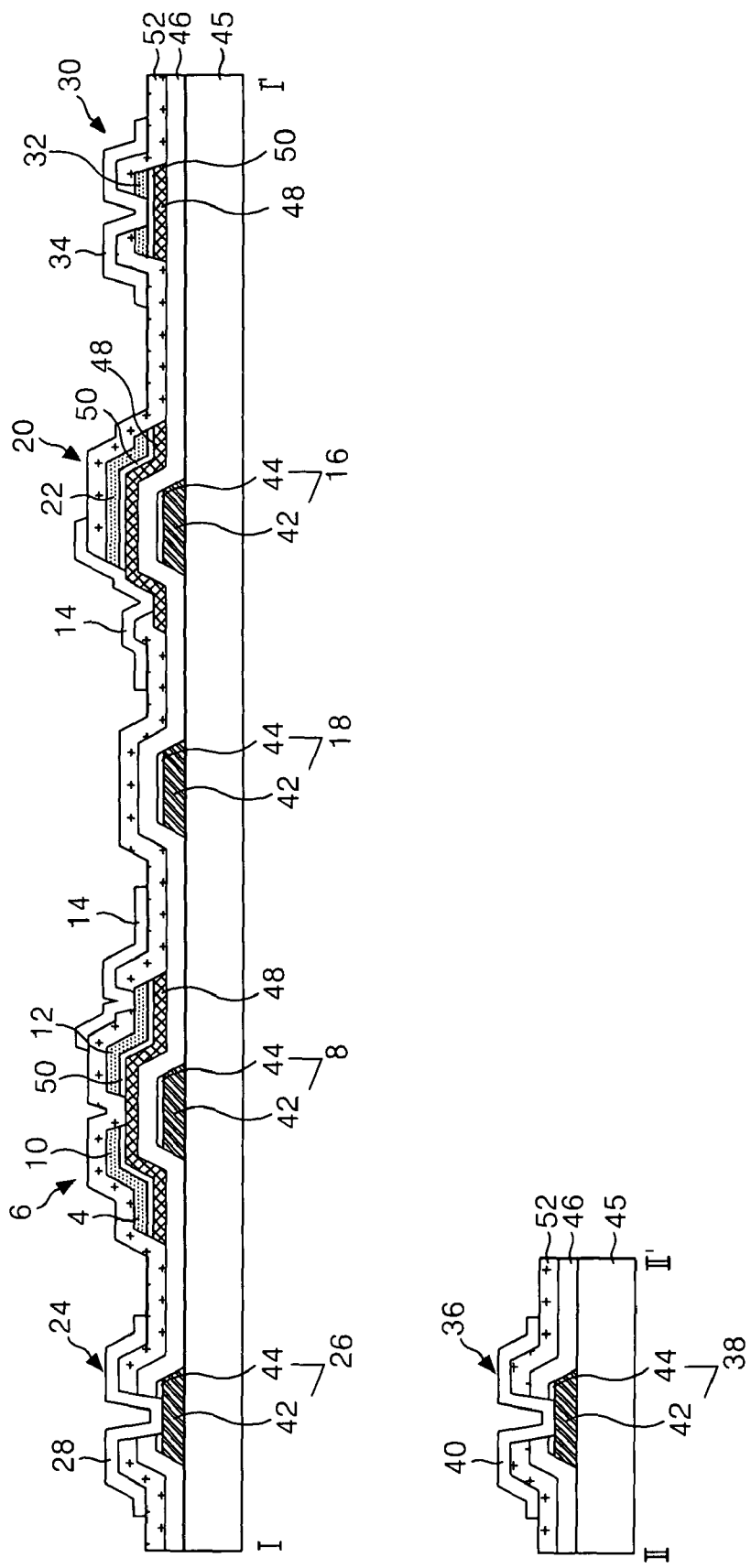
Figure 4:
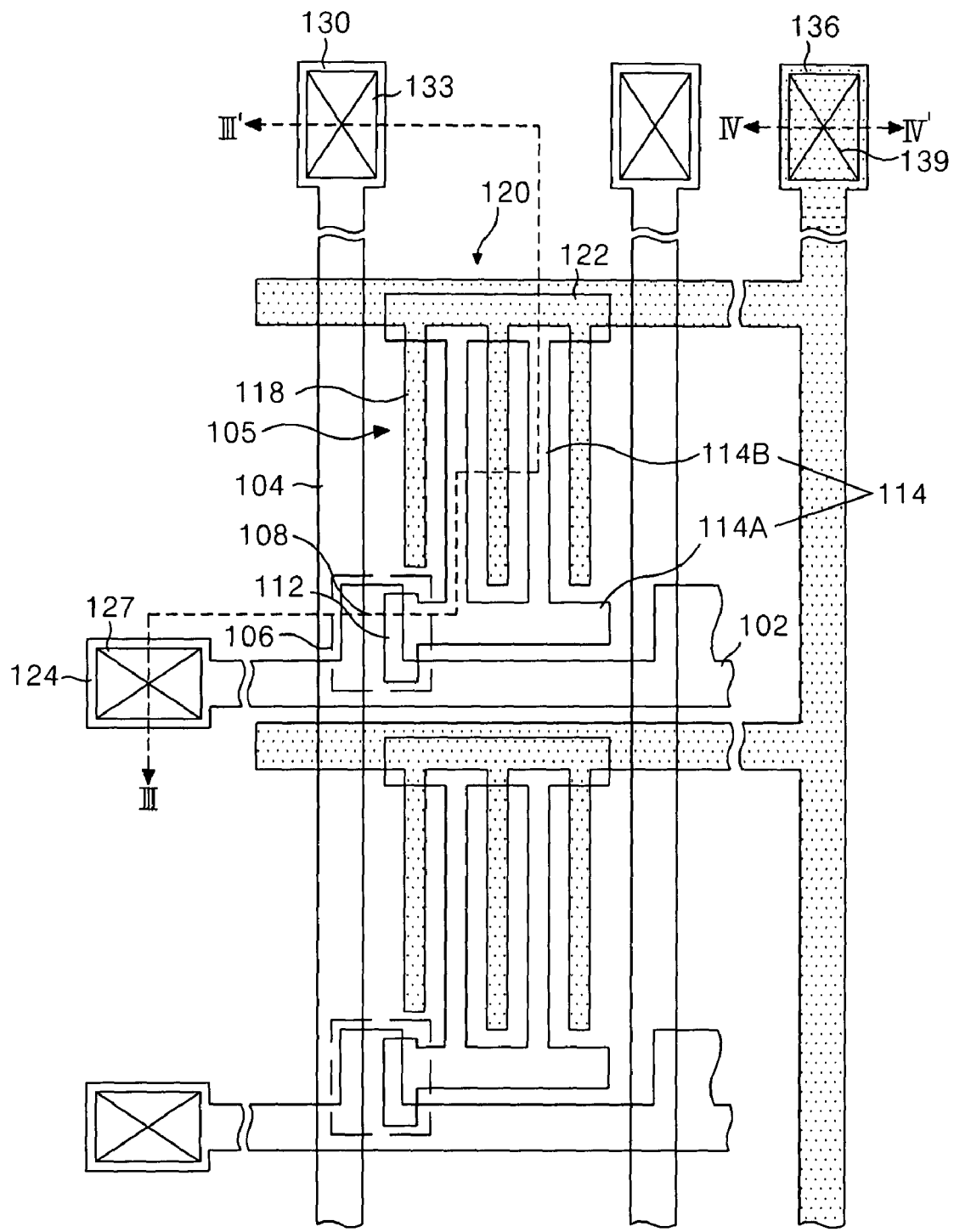
FIG. 4 is a plan view illustrating a thin film transistor array substrate among the liquid crystal display of horizontal electric applying type according to a first embodiment of the present invention.
Figure 5:
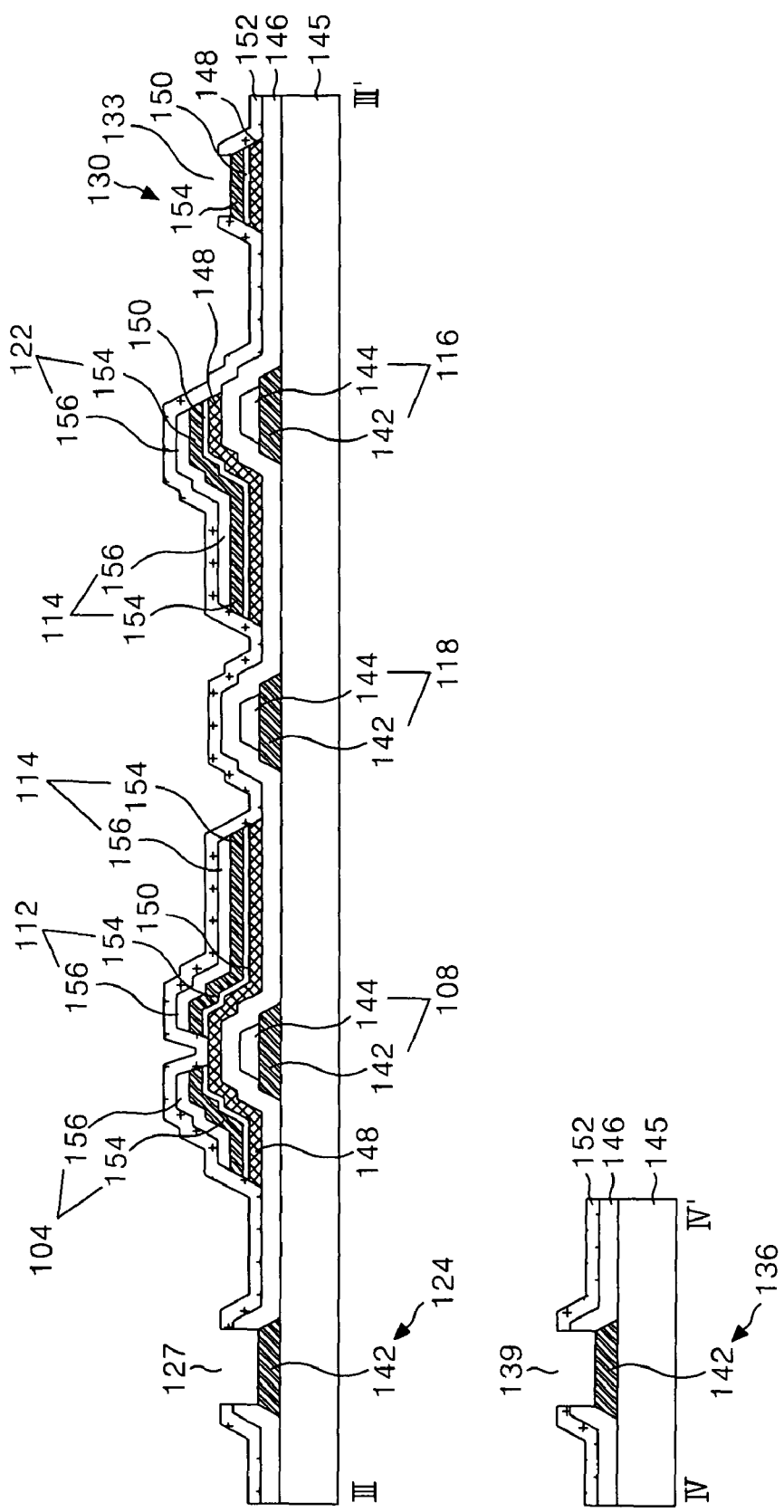
FIG. 5 is a sectional view of the thin film transistor array substrate taken along the lines III-III' and IV-IV' in FIG. 4.

FIG. 4 is a plan view showing a thin film transistor array substrate of the liquid crystal display of a horizontal electric field applying type according to a first embodiment of the present invention, and FIG. 5 is a sectional view of the thin film transistor array substrate taken along the lines III-III' and IV-IV' in FIG. 4.

As shown in FIGS. 4 and 5, the thin film transistor array substrate comprises a gate line 102 and a data line 104, which have a gate insulating film 146 therebetween, formed crossing each other on a lower substrate 145, a thin film transistor 106 formed at each crossing of the gate line 102 and the data line 104, a pixel electrode 114 and common electrodes 118 formed in order to apply the horizontal electric field in a pixel region defined by the interconnection and common lines 116 connected to common electrodes 118. Further, the thin film transistor array substrate comprises a storage capacitor 120 formed at an overlapped portion between an upper storage electrode 122 and the common lines 116, a gate pad 124 extended from the gate line 102, and a data pad 130 extended form data line 104 and a common pad 136 extended from the common lines 116.

The gate line 102 for supplying a gate signal and the data line 104 for supplying a data signal are formed crossing to thereby define a pixel region 105.

The common line 116 supplying a reference voltage for driving the liquid crystal is formed in parallel with the gate line 102 with the pixel region 105 positioned between the common line 116 and the gate line 102.

The thin film transistor 106 responds to the gate signal of the gate line 102 so that the pixel signal of the data line 104 is charged and maintained in the pixel electrode 114. To this end, the thin film transistor 106 comprises a gate electrode 108 connected to the gate line 102, a source electrode included in the data line 104 and a drain electrode 112 connected to the pixel electrode 114. Further, the thin film transistor 106 includes an active layer 148 overlapping with the gate electrode 108 with a gate insulating film 146 positioned therebetween and defining a channel between the source electrode and the drain electrode 112.

The active layer 148 is formed to overlap with the data line 104, the data pad 130 and an upper storage electrode 122. On the active layer 148, an ohmic contact layer 150 for making an ohmic contact with the data line 104, the drain electrode 112, the data pad 130 and the upper storage electrode 122 is further provided.

The pixel electrode 114 integral to the drain electrode 112 of the thin film transistor 106 and the upper storage electrode 122 is formed in the pixel region 105. Particularly, the pixel electrode 114 comprises a horizontal part 114A extended in parallel with adjacent gate line 102 from the drain electrode 112 and a finger part 114B extending from the horizontal part 114A in vertical direction.

The common electrode 118 is connected to the common line 116 and is formed in the pixel region 105. Specially, the common electrode 118 is formed in parallel with the finger part 114B of the pixel electrode 114 in the pixel region 105.

Accordingly, a horizontal electric field is formed between the pixel electrode 114 to which the pixel signal is supplied via the thin film transistor 106 and the common electrode 118 to which the reference voltage is supplied via the common line 116. Specially, the horizontal electric field is formed between the finger part 114B of the pixel electrode 114 and the common electrode 118. The liquid crystal molecules arranged in the horizontal direction between the thin film transistor array substrate and the color filter array substrate by the horizontal electric field becomes to rotate due to a dielectric anisotropy. Further, the light transmittance transmitting through the pixel region 105 differs in accordance with a rotation amount of the liquid crystal molecules and thereby the pictures can be represented.

The storage capacitor 120 consists of the common line 116 and the upper storage electrode 122 overlapping with the common line 116 with the gate insulating film 146, the active layer 148 and the ohmic contact layer 150 therebetween and being integral with the pixel electrode 114. The storage capacitor 120 allows a pixel signal charged in the pixel electrode 114 to be maintained stably until the next pixel signal is charged.

The gate line 102 is connected, via the gate pad 124, to a gate driver (not shown) mounted on a tape carried package (TCP). The gate pad 124 is extended from the gate line 102 and is exposed through a first contact hole 127 passing through a gate insulating film 146 and a passivation film 152. The gate pad 124 has an exposed structure of metal layer that has a relatively high strength and corrosion resistance such as titanium (Ti) and tungsten (W) included in the gate line 102. Accordingly, although the process of attaching the gate pad 124 and TCP is performed repeatedly, there does not occur the defect caused by the opening of the gate pad 124.

The common line 116 is supplied with the reference voltage from the reference voltage source of exterior (not shown) via a TCP attached to the common pad 136. The common pad 136 is extended from the common line 116 and is exposed through a third contact hole 127 passing through a gate insulating film 146 and a passivation film 152. The common pad 136 has an exposed structure of a metal layer that has a high strength and corrosion resistance such as titanium (Ti) and tungsten (W) similar to the gate pad 124. Accordingly, although the process of attaching the common pad 136 and the TCP is performed repeatedly, there does not occur the defect caused by the opening of the common pad 136.

More specifically, the gate line 102, the gate electrode 108, the common line 116 and common electrode 118 have double-layer structure metal layers with a first and a second metal layer 142 and 144. Among the metal layers, a metal layer is made of any metal that has a relatively high strength and corrosion resistance such as titanium (Ti) and tungsten (W). Whereas, another metal layer is made of a low resistance metal such as an aluminum (Al) system metal, molybdenum (Mo) and copper (Cu) that are conventionally employed as a gate metal.

Where the first metal layer 142 is made of any metal that has a high strength and corrosion resistance, the gate pad 124 and the common pad 138 have an exposed structure in which the second metal layer 144 of an upper portion is removed and the first metal layer 142 of the lower portion is exposed. On the other hand, where the second metal layer 144 is made of any metal that has a high strength and corrosion resistance, the gate pad 124 and the common pad 138 have an exposed structure in which the second metal layer 144 of an upper portion is exposed.

The data line 104 is connected to a data driver (not shown) mounted on a TCP via the data pad 130. The data pad 130 is extended from the data line 104 and is exposed through a second contact hole 133 passing through a passivation film 152. The data pad 130 has an exposed structure of the metal layer that has a relatively high strength and corrosion resistance such as titanium (Ti) and tungsten (W) included in the data line 104. Accordingly, although the process of attaching the data pad 130 and the TCP is performed repeatedly, there does not occur a defect caused by the opening of the data pad 130.

More specifically, the data line 104, the drain electrode 112, the pixel electrode 114 and the upper storage electrode 122 have double-layer structure metal layers stacked with a first and a second metal layer 154 and 156. One metal layer of the metal layers is made of any metal that has a relatively high strength and corrosion resistance such as titanium (Ti) and tungsten (W). The other metal layer is made of a low resistance metal such as an aluminum (Al) system metal, molybdenum (Mo) and copper (Cu) that are generally employed as a gate metal.

In this connection, where the first metal layer 154 is made of any metal having a high strength and corrosion resistance, the data pad 130 has an exposed structure in which the second metal layer 156 of an upper portion is removed and the first metal layer 154 of a lower portion is exposed. On the other hand, in case where the second metal layer 156 is made of any metal having a high strength and corrosion resistance, the data pad 130 has an exposed structure in which the second metal layer 156 of an upper portion is exposed.

Figure 6A:
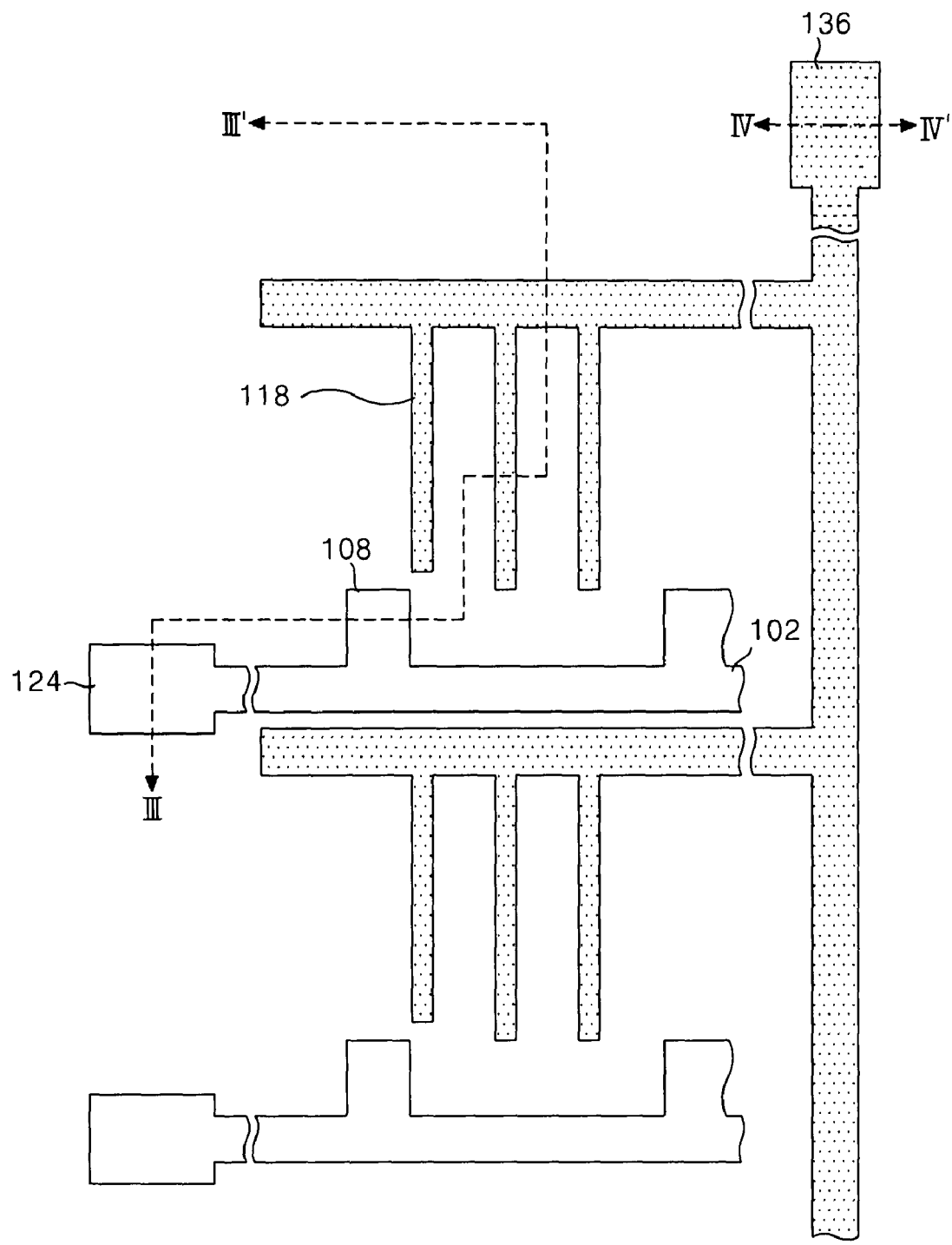

FIGS. 6A and 6B are a plan view and a sectional view for explaining a first mask process among a manufacturing method of the thin film transistor array substrate of horizontal electric applying type according to embodiment of the present invention, respectively.

As shown in FIGS. 6A and 6B, a first conductive pattern group including the gate line 102, the gate electrode 108 and the gate pad 124, the common line 116, the common electrode 118 and the common pad 136 is formed on the lower substrate 145 using the first mask process.

More specifically, a first gate metal layer 142 and a second gate metal layer 144 are sequentially formed on the upper substrate 145 by a deposition method such as a sputtering, to form a gate metal layer of double-layer structure. Then, the gate metal layers are patterned by the photolithography and the etching process using a first mask to form the first conductive pattern group including the gate line 102, the gate electrode 108, the gate pad 124, the common line 116, common electrode 118 and the common pad 136. Herein, any one of the first gate metal layer 142 and the second gate metal layer 144 are made of any metal that has a relatively high strength and corrosion resistance such as titanium (Ti) and tungsten (W), whereas another metal layer is made of a metal such as an aluminum (Al) system metal, molybdenum (Mo) or copper (Cu).

Figure 7A:
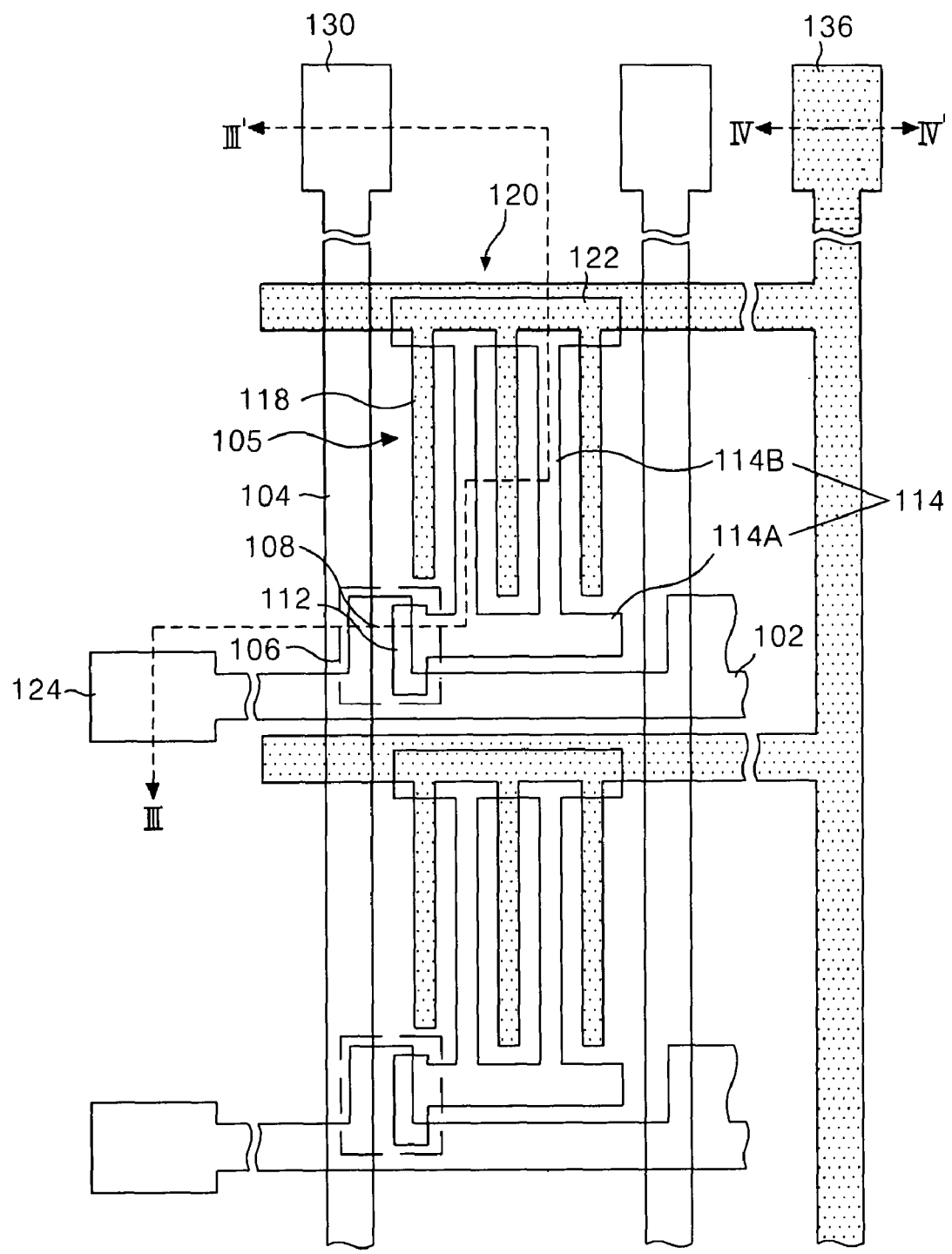
FIGS. 7A and. 7B are a plan view and a sectional view illustrating a second mask process among the manufacturing method of a thin film transistor array substrate according to the first embodiment of the present invention, respectively.

FIGS. 7A and 7B are a plan view and a sectional view for explaining a second mask process among the manufacturing method of a thin film transistor array substrate of horizontal electric applying type according to embodiment of the present invention, respectively.

At first, a gate insulating film 146 is formed on the lower substrate 145 provided with the first conductive pattern group by a deposition method such as plasma enhanced chemical vapor deposition (PECVD) or sputtering. The gate insulating film 146 is made of an inorganic insulating material such as silicon oxide (SiOx) or silicon nitride (SiNx).

Further, as shown in FIGS. 7A and 7B, a semiconductor pattern group including an active layer 148 and the ohmic contact layer 150 and the second conductive pattern group including the data line 104, the drain electrode 112, the pixel electrode 114, the data pad 130 and the upper storage electrode 122 are formed on the gate insulating film 146 using the second mask process.

The second mask process will be explained with reference to FIGS. 8A to 8E.

Figure 8A:
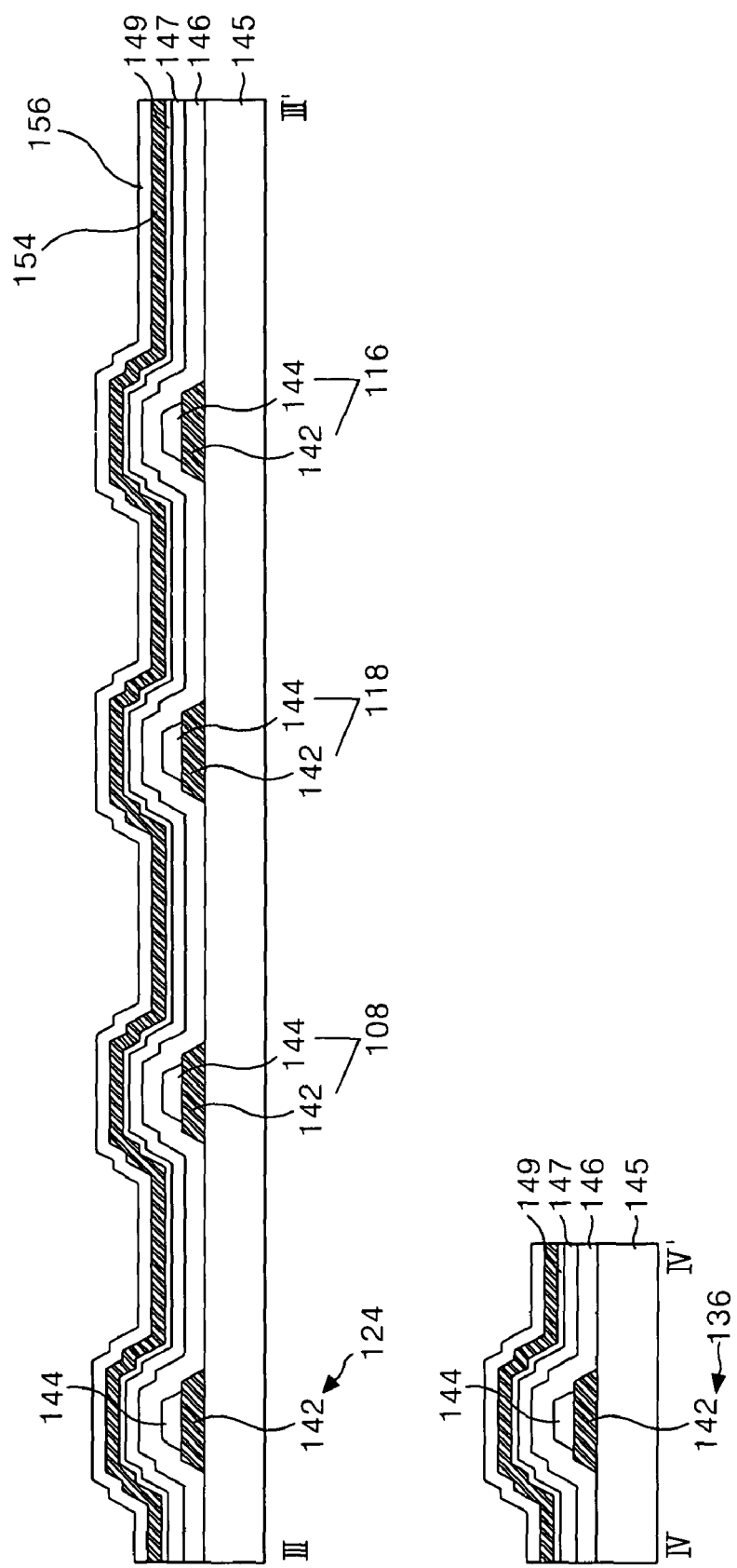

As shown in FIG. 8A, on the gate insulating film 146, an amorphous silicon layer 147, a n+ amorphous silicon layer 149, a first and a second source/drain metal layer 154 and 156 are sequentially provided by deposition techniques such as plasma enhanced chemical vapor deposition (PECVD) and sputtering, etc. Herein, any one of the first and the second source/drain metal layers 154 and 156 is made of a metal that has a relatively high strength and corrosion resistance such as titanium (Ti) and tungsten (W), whereas another metal layer is made of a metal such as an aluminum (Al) system metal, molybdenum (Mo) and copper (Cu).

Thereafter, a photo-resist film is formed on the second source/drain metal layer 156 and then a photo-resist pattern 168 having a stepped part is formed by a photolithography using a second mask 160 for a partial exposure as shown in FIG. 8B. The second mask 160 comprises a mask substrate 162 which is a transparent material, a cut-off part 164 formed on a cut-off region P2 of the mask substrate 162 and a diffractive exposure part 166 (or a semi-transmitting part) formed on a partial exposure region P3 of the mask substrate 162. Herein, a region in which the mask substrate 162 is exposed becomes an exposure region P1. The photo-resist film is developed using the second mask 160 as set forth above, to thereby form the photo-resist pattern 168 which has a stepped part in the cut-off region P2 and the partial exposure region P3 depending on the diffractive exposure part 166 and cut-off part 164 of the second mask 160. More particularly, the photo-resist pattern 168 formed in the partial exposure region P3 has a second height H2 that is lower than a first height H1 of the photo-resist pattern 168 formed to the cut-off region P2.

Figure 8C:
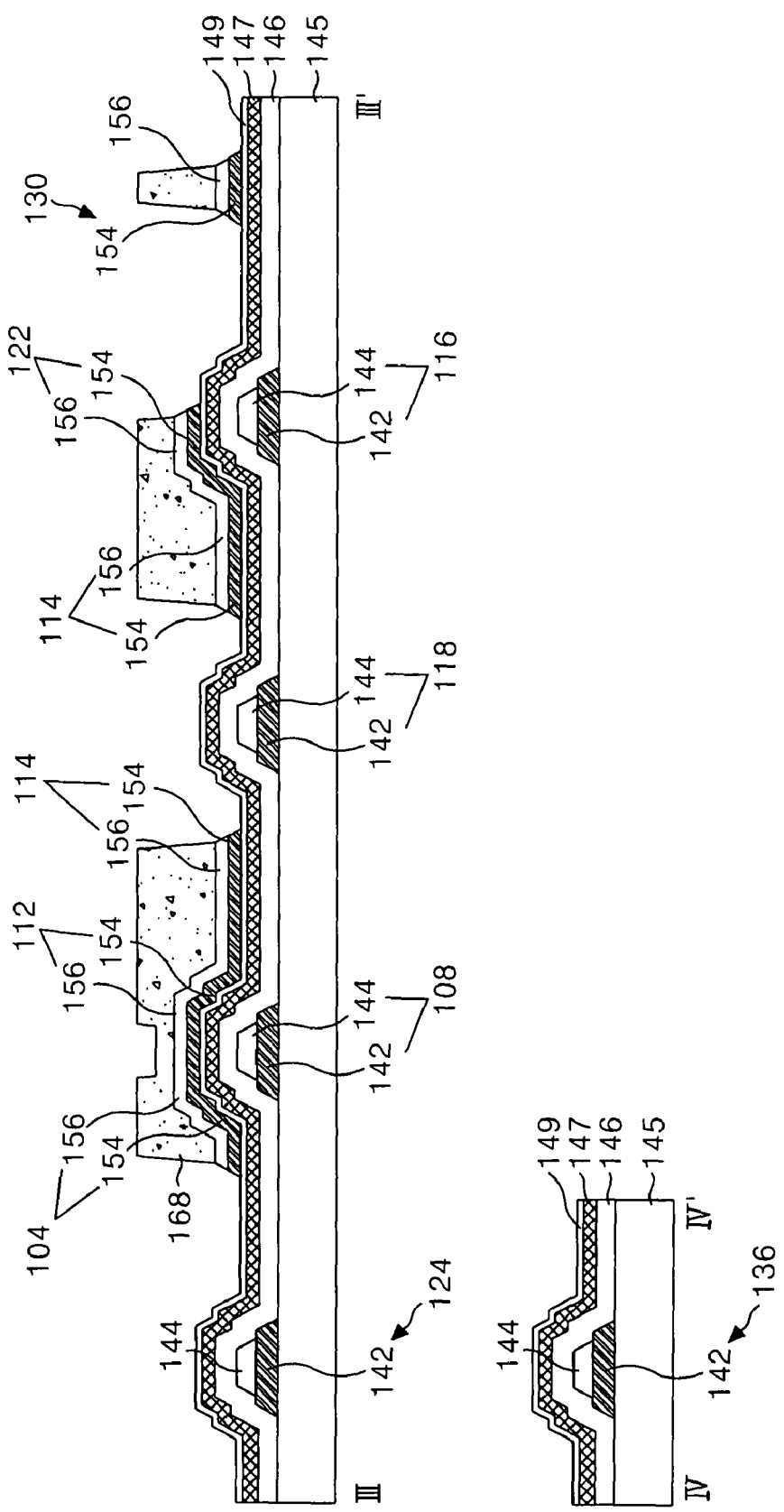

Subsequently, the first and the second source/drain metal layer 154 and 156 are patterned by a wet etching process using the photo-resist pattern 168, so that the second conductive pattern group including the data line 104, the drain electrode 112 connected to the data line 104, the pixel data, the upper storage electrode 122 and the data pad 130 is formed as shown in FIG. 8C.

Further, the n+ amorphous silicon layer 149 and the amorphous silicon layer 147 are patterned by a dry etching process using the photo-resist pattern 160 to provide the ohmic contact layer 150 and the active layer 148 along the second conductive pattern group. Next, the photo-resist pattern 168 formed with the second height H2 in the partial exposure region P3 is removed by the ashing process using an oxygen (O$_2$) plasma as shown in FIG. 8D, whereas the photo-resist pattern 168 formed with the first height H1 in the cut-off region P2 has a lowered height. The partial exposure region P3 is formed by an etching process using the photo-resist pattern 168. Thus, the first and the second source/drain metal layers 154 and 156 formed at channel portion of the thin film transistor are removed. For instance where the second source/drain metal layer 156 is made of molybdenum Mo and the first source/drain metal layer 154 is made of titanium Ti, the second source/drain metal layer 156 is removed in the channel portion by a dry etching process and the first source/drain metal layer 154 is removed by a wet etching process in the channel portion. By contrast, in case where the second source/drain metal layer 156 is made of titanium Ti and the first source/drain metal layer 154 is made of molybdenum Mo, the second source/drain metal layer 156 is removed by a wet etching process in the channel portion and the first source/drain metal layer 154 is removed by a dry etching process in the channel portion. Accordingly, the drain electrode 112 is separated from the data line 104 including the source electrode. Thereafter, the ohmic contact layer 150 is removed by a dry etching process using the photo-resist pattern 168 to thereby expose the active layer 148. Further, the photo-resist pattern 168 left on the second conductive pattern group is removed by a stripping process as shown in FIG. 8E.

Figure 9A:
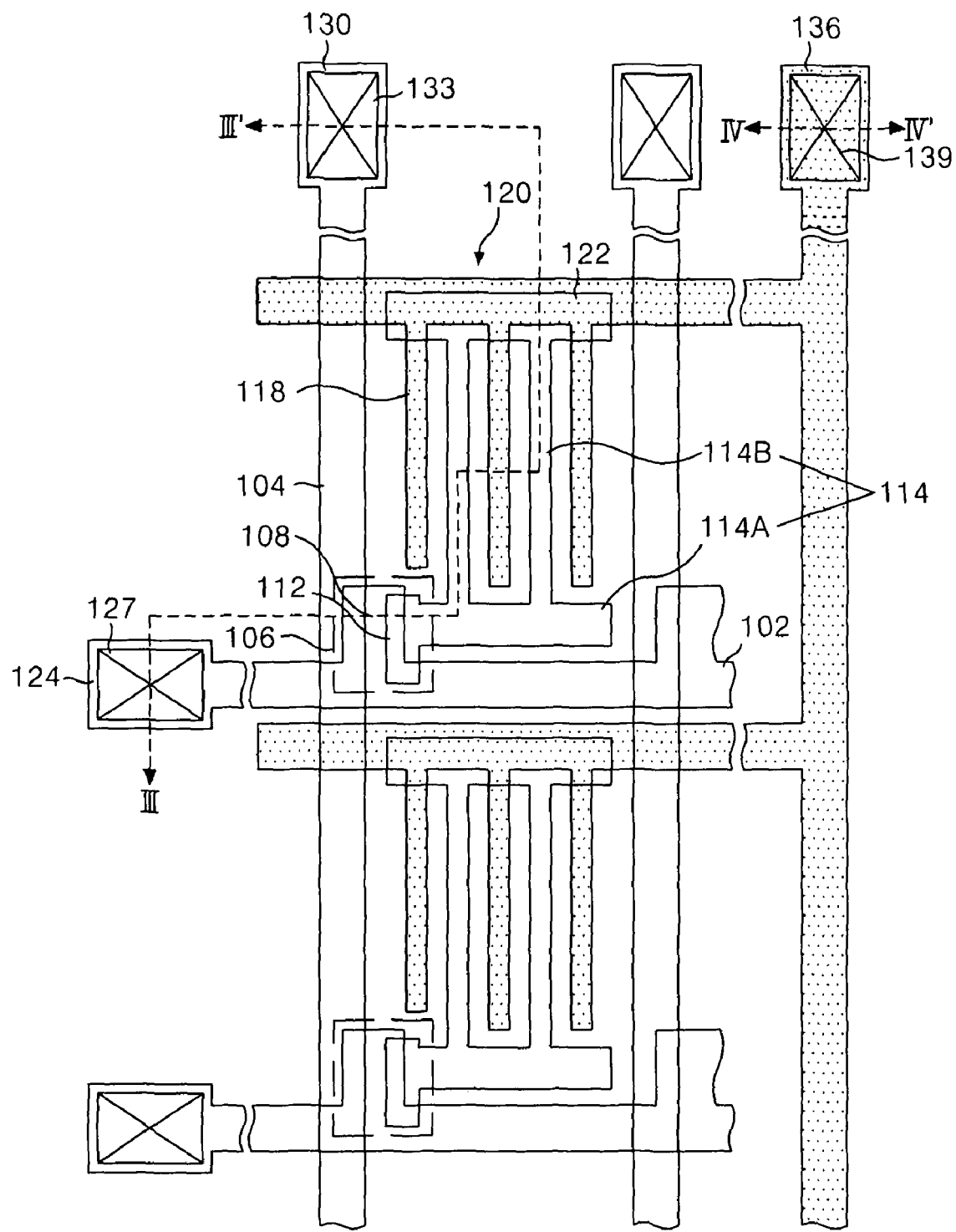
FIGS. 9A and 9B are a plan view and a sectional view illustrating a third mask process among the manufacturing method of a thin film transistor array substrate according to the first embodiment of the present invention, respectively.
Figure 9B:
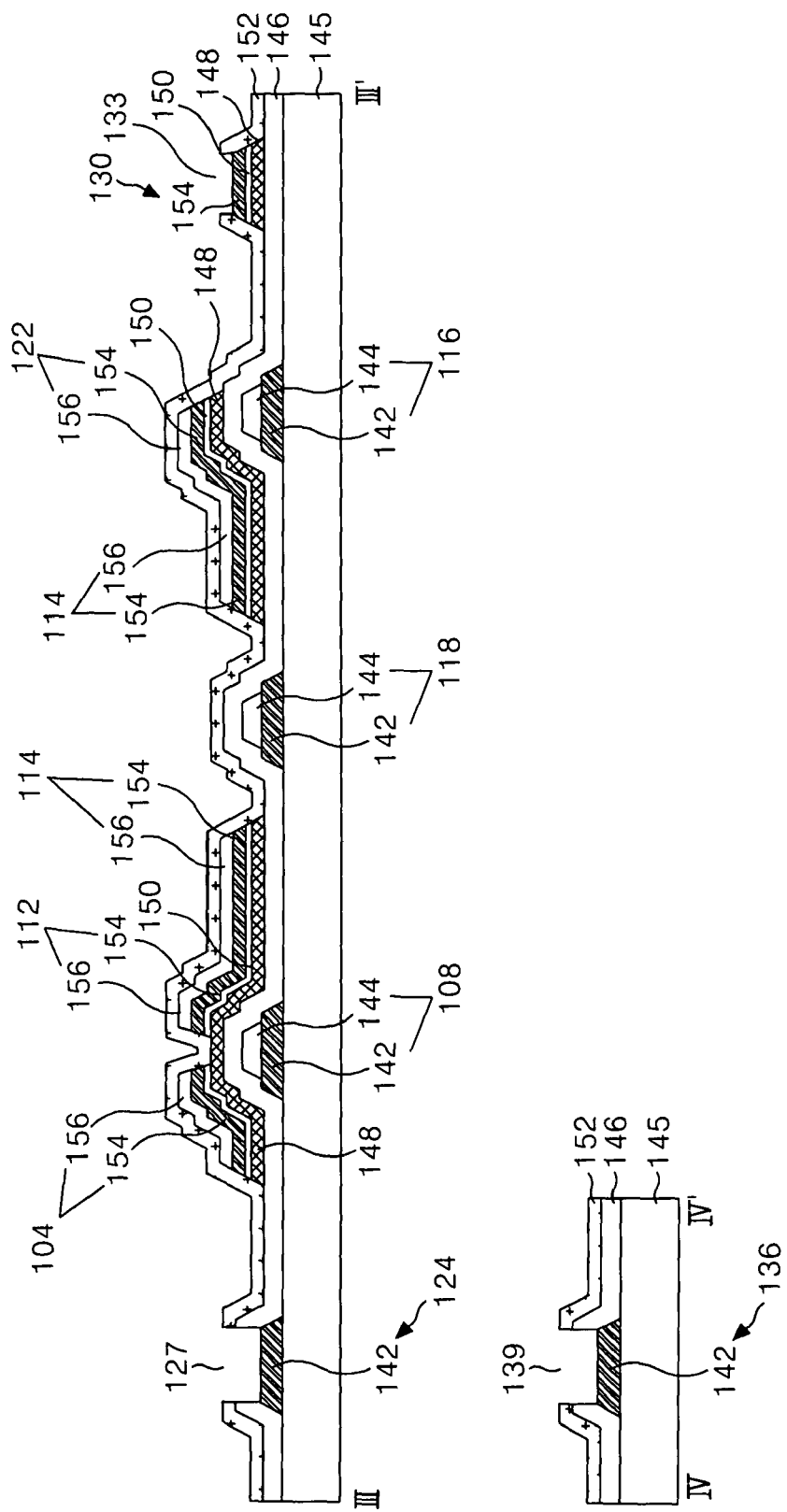

FIGS. 9A and 9B are a plan view and a sectional view for explaining a third mask process among the manufacturing method of a thin film transistor array substrate according to the embodiment of the present invention, respectively.

The passivation film 152 including first to third contact holes 127, 133 and 139, respectively is formed on the gate insulating film 146 stacked with the semiconductor pattern and a source/drain metal pattern by the third mask process as shown in FIGS. 9A and 9B.

More specifically, the passivation film 152 is formed by a deposition technique such as plasma enhanced chemical vapor deposition (PECVD) on the gate insulating film 146 where semiconductor pattern is stacked. The passivation film 152 is made of an inorganic material such as the gate insulating film 146 or an organic material having a small dielectric constant such as an acrylic organic compound, BCB (benzocyclobutene) or PFCB (perfluorocyclobutane), etc. Subsequently, the passivation film 152 is patterned by a photolithography and etching process using the third mask to form the first to the third contact holes 127, 133 and 139. The first contact hole 127 is formed in such a manner as to pass through the passivation film 152 and the gate insulating film 146 and expose the gate pad 124, the second contact hole 133 is formed in such a manner as to pass through the passivation film 152 and expose the data pad 130, and the third contact hole 139 is formed in such a manner as to pass through the passivation film 152 and the gate insulating film 146 and expose the common pad 136. The exposed gate pad 124, the data pad 130 and the common pad 136 have an exposed structure of metal that has a high strength and corrosion resistance. In this example, the gate pad 124, the data pad 130 and the common pad 136 have two structures as shown in FIGS. 10 and 11.

Figure 10:
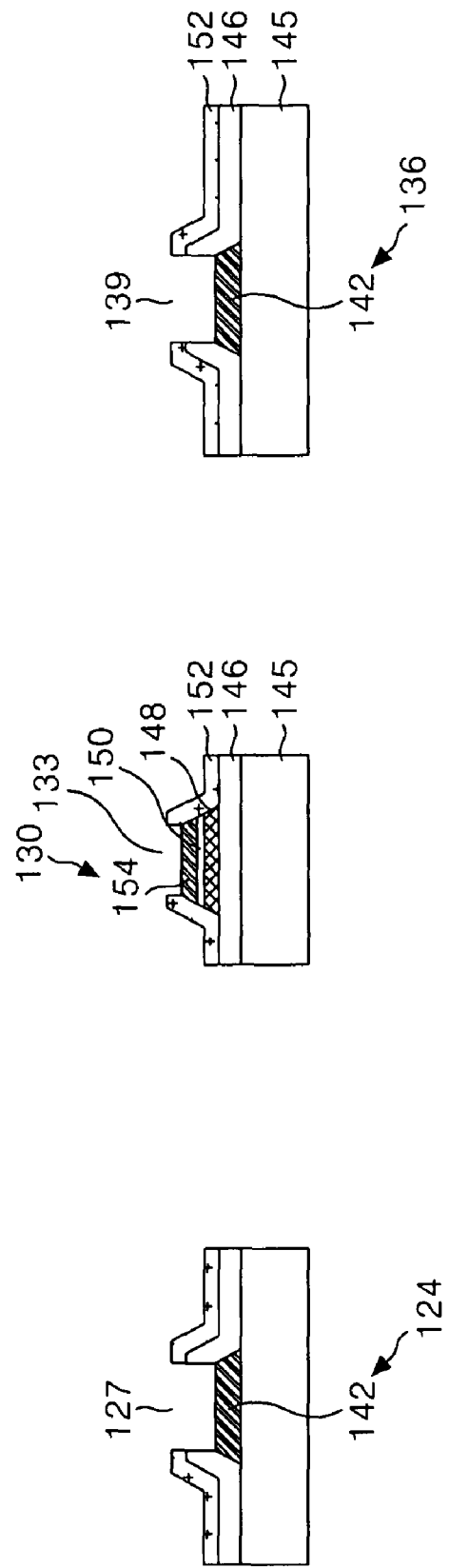
FIG. 10 is a sectional view illustrating pads of a first structure in the thin film transistor substrate according to the first embodiment of the present invention.

For instance, where the first gate metal layer 142 of a lower portion is made of titanium Ti and the second gate metal layer 144 of an upper portion is made of molybdenum Mo, the gate pad 124 and the common pad 136 include only the first gate metal layer 142 of the lower portion as shown in FIG. 10. This is because the second gate metal layer 144 of the upper portion is removed so the etching process employed may form the first and the third contact hole 127 and 139.

Figure 11:
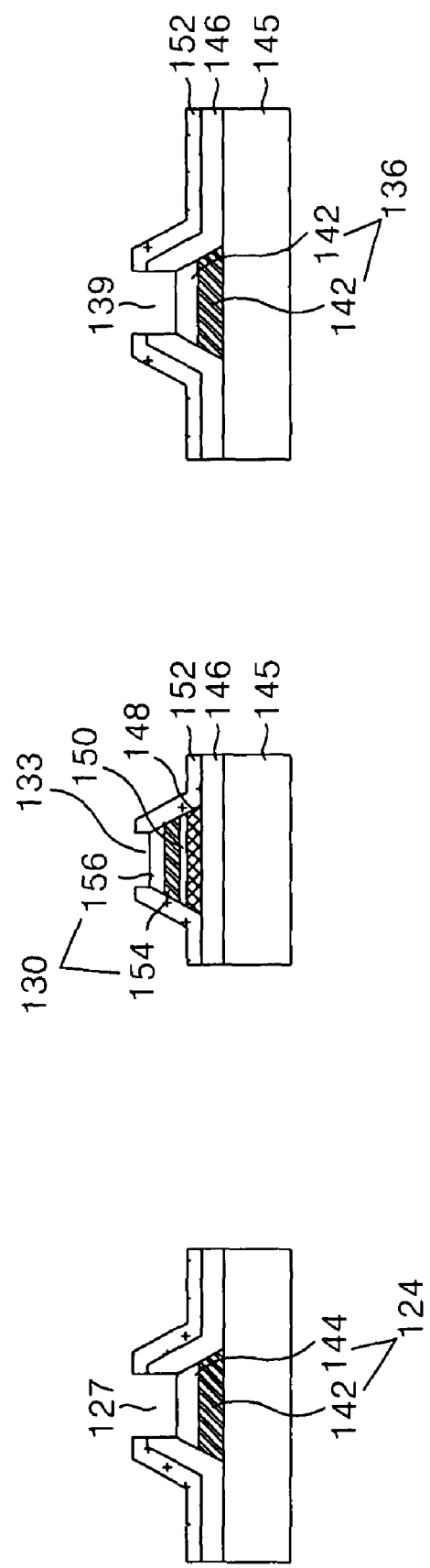
FIG. 11 is a sectional view illustrating pads of a second structure in the thin film transistor substrate according to the first embodiment of the present invention.

By contrast, where the first gate metal layer 142 of the lower portion is made of molybdenum Mo and the second gate metal layer 144 of the upper portion is made of titanium Ti, the gate pad 124 and the common pad 136 have a double-layer structure of metal layers in which the first and the second gate metal layers 142 and 144 are stacked as shown in FIG. 11. Also, the gate pad 124 and the common pad 136 have an exposed structure that includes the gate metal layer 144 of the upper portion through the use of the first and the third contact hole 127 and 139.

Further where the first source/drain metal layer 154 of the lower portion is made of titanium Ti and the second source/drain metal layer 156 of the upper portion is made of molybdenum Mo, the data pad 130 consists of only the first source/drain metal layer 154 of the lower portion as shown in FIG. 10. This is because the second source/drain metal layer 156 is removed for the etching process employed to form the second contact hole 133.

On the contrary, where the first source/drain metal layer 154 of the lower portion is made of molybdenum Mo and the second source/drain metal layer 156 is made of titanium Ti, the data pad 130 has a double-layer structure of metal layers in which the first and the second source/drain metal layers 154 and 156 are stacked as shown in FIG. 11. Also, the data pad 130 has an exposed upper portion of the source/drain metal layer 156 through the use of the second contact hole 133.

As described above, according to the first embodiment of the invention, the thin film transistor array substrate of the horizontal electric field applying type and the fabricating method thereof of the first embodiment of the present invention, the pixel electrode 114 is formed with an identical metal to the drain electrode 112. Further, the common pad 136 uses any metal that has a high strength and corrosion resistance to prevent the defect of the opening of the common pad regardless of the repeated process of attaching the TCP. Accordingly, a transparent conductive film is free in the present invention, that is, the process including the transparent conductive film deposition process and patterning process is unnecessary, which leads to eliminating one mask process. In other words, the thin film transistor array substrate of horizontal electric applying type according to the present invention is formed using a three-round mask process.

Figure 12:
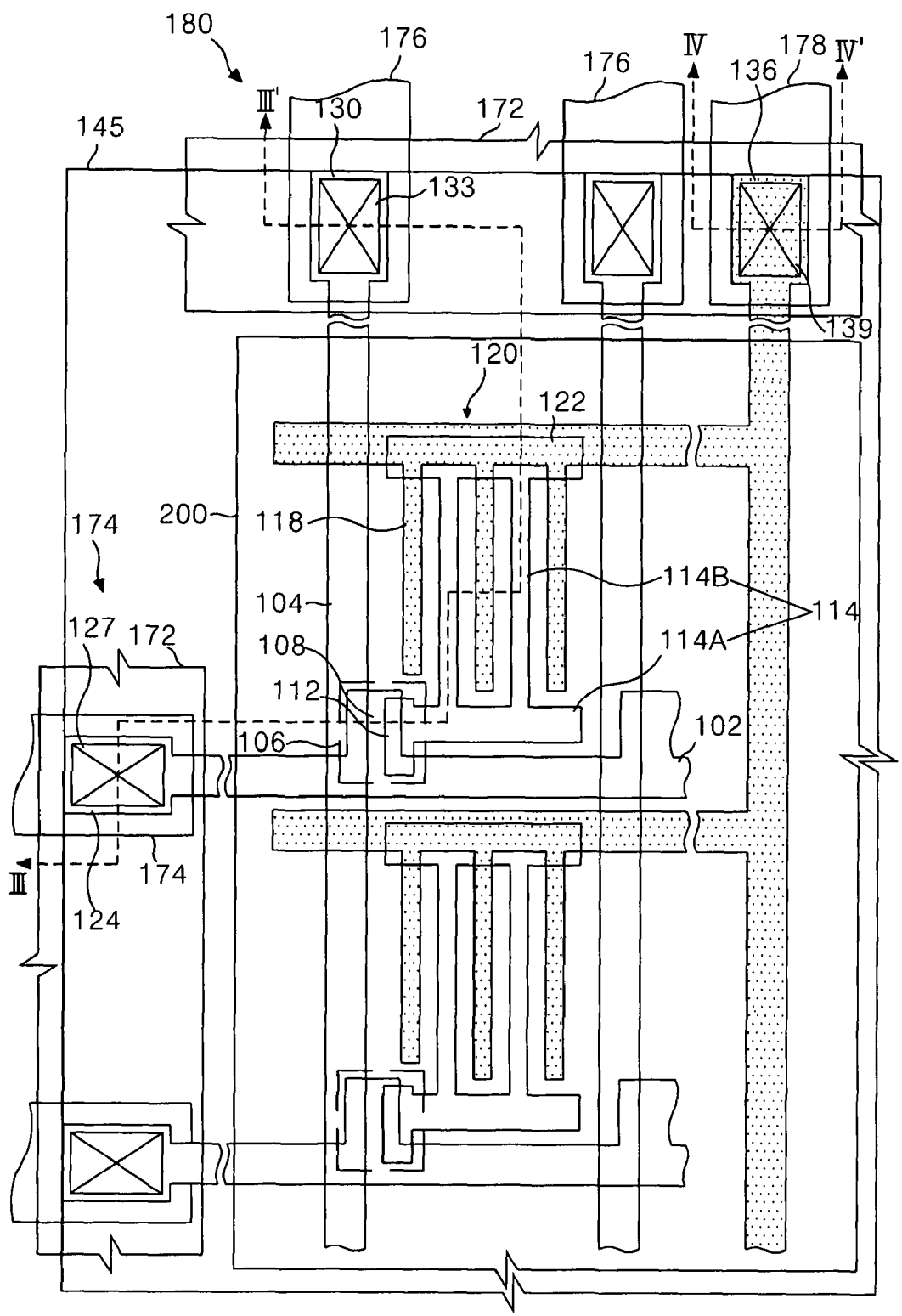
FIG. 12 is a plan view illustrating a liquid crystal display according to the first embodiment of the present invention.
Figure 13:
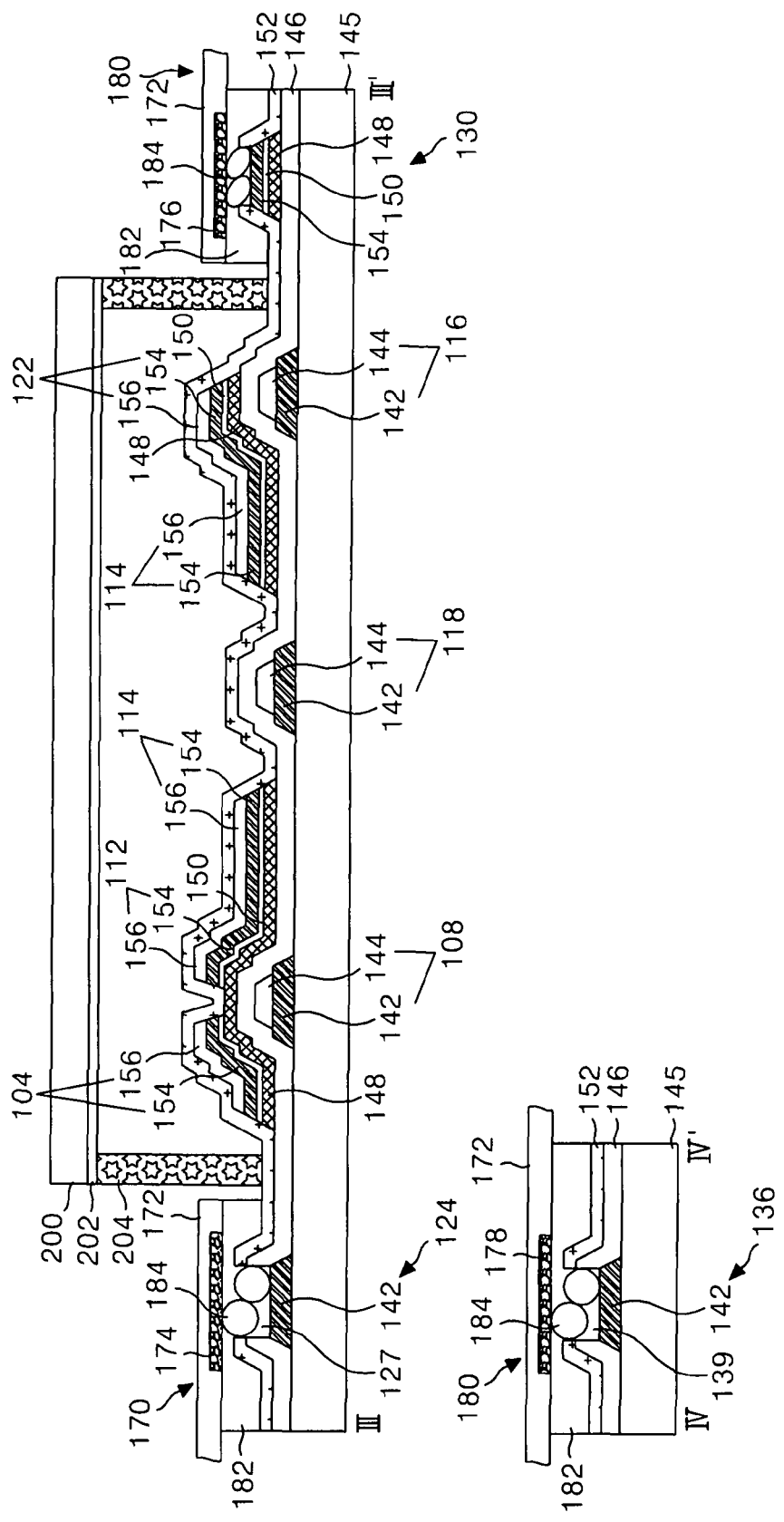
FIG. 13 is a plan view illustrating the liquid crystal display shown in FIG. 12.

Subsequently, the finished thin film transistor array substrate and a upper substrate of a color filter array 202 manufactured using another process are combined using a sealant 204 and then a liquid crystal (not shown) is injected therebetween, to thereby fabricate a liquid panel as shown FIGS. 12 and 13. In this case, the upper substrate 200 is combined so as not to overlap with a pad region where the gate pad 124, the data pad 130 and the common pad 136 are formed on the thin film transistor array substrate.

Subsequently, TCPs 170 and 180 on which drive ICs are mounted are attached with each other on a pad region of the thin film transistor array substrate using anisotrophic conductive film (ACF) including a conductive ball 184. Accordingly, each of output pads 174 and 176 and 178 formed on the TCP 170 and 180 is electrically connected to the gate pad 124, the data pad 130 and the common pad 136, respectively, via the conductive ball 184 of the ACF 182. More particularly, a first TCP pad 174 formed on a base film 172 of the gate TCP 170 is electrically connected to the gate pad 124, a second TCP pad 176 formed on the base film 172 of the data TCP 180 is electrically connected to the data pad 130, and a third TCP pad 178 formed on the base film 172 of the data TCP 180 is electrically connected via the first gate metal layer 142 of the common pad 136 and the ACF 182. In this case, the gate pad 124, the data pad 130 and the common pad 136 have a structure wherein a metal layer having a high strength and corrosion resistance is exposed, so that there does not occur the defect caused by the opening of the pads even though attaching process of the TCP 170 and 180 is performed repeatedly.

Figure 14:
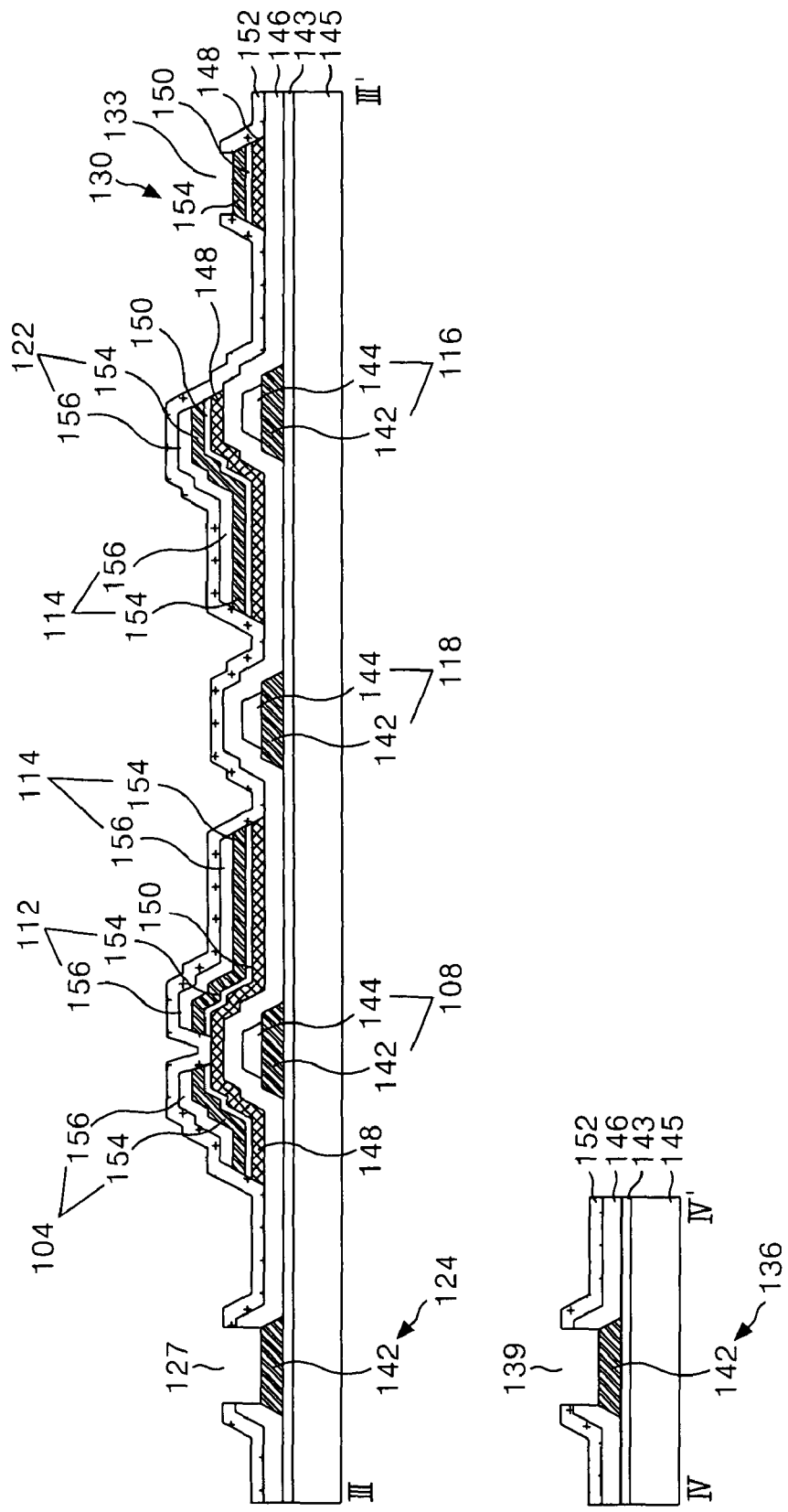
FIG. 14 is plan view illustrating a thin film transistor array substrate among the liquid crystal display of horizontal electric applying type according to a second embodiment of the present invention.

FIG. 14 is plan view showing a thin film transistor array substrate among the liquid crystal display of horizontal electric applying type according to a second embodiment of the present invention.

As shown in FIG. 14, the thin film transistor array substrate comprises identical elements to those of the thin film transistor array substrate shown in FIGS. 4 and 5 except for an etching preventive layer 143 for protecting the lower substrate 145 from an etchant used to etch the first gate metal layer 142 and the second gate metal layer 144. Accordingly, the detailed description on the identical elements will be omitted for the sake of simple illustration.

The first gate metal layer 142 or the second gate metal layer 144 of the thin film transistor array substrate according to a second embodiment of the prevent invention is made of any metal that has a relatively high strength and corrosion resistance such as titanium (Ti) and tungsten (W) is used. In this case, an etchant used to pattern the metal layer includes about 0.5% of hydrofluoric acid (HF) system. The etching preventive layer 143 is formed on the lower substrate 145 to prevent the lower substrate 145 that is a glass material from being over-etching by the etchant of hydrofluoric HF system. The etching preventive layer 143 is made of a transparent oxide system material such as $TiO_2$ or $Al_2O_3$, which are strong against the etchant of hydrofluoric acid (HF) system.

On the other hand, a fabricating method of the thin film transistor substrate according to the second embodiment of the present invention further includes the step of forming an etching preventive layer in comparison with the manufacturing method of the thin film transistor according to the first embodiment of the present invention. In this connection, the second and the third mask processes are the same as described above and therefore the detailed description thereof will be omitted.

Figure 15A:
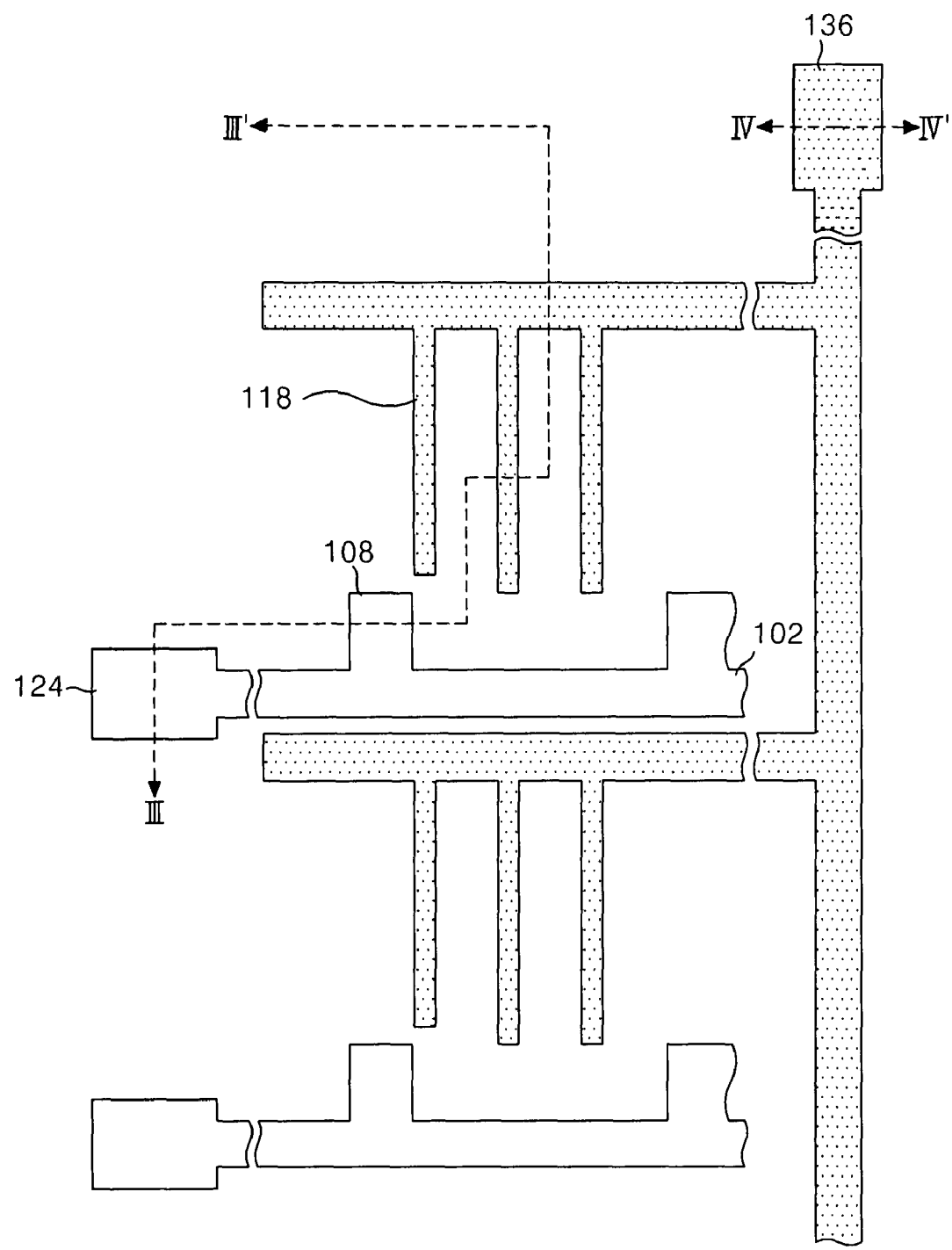
FIGS. 15A and 15B are a plan view and a sectional view illustrating a first mask process among a manufacturing method of a thin film transistor array substrate according to the second embodiment of the present invention, respectively.

FIGS. 15A and. 15b are a plan view and a sectional view respectively, for explaining a first mask process among a manufacturing method of a thin film transistor array substrate of horizontal electric field applying type according to the second embodiment of the present invention, respectively.

Figure 15B:
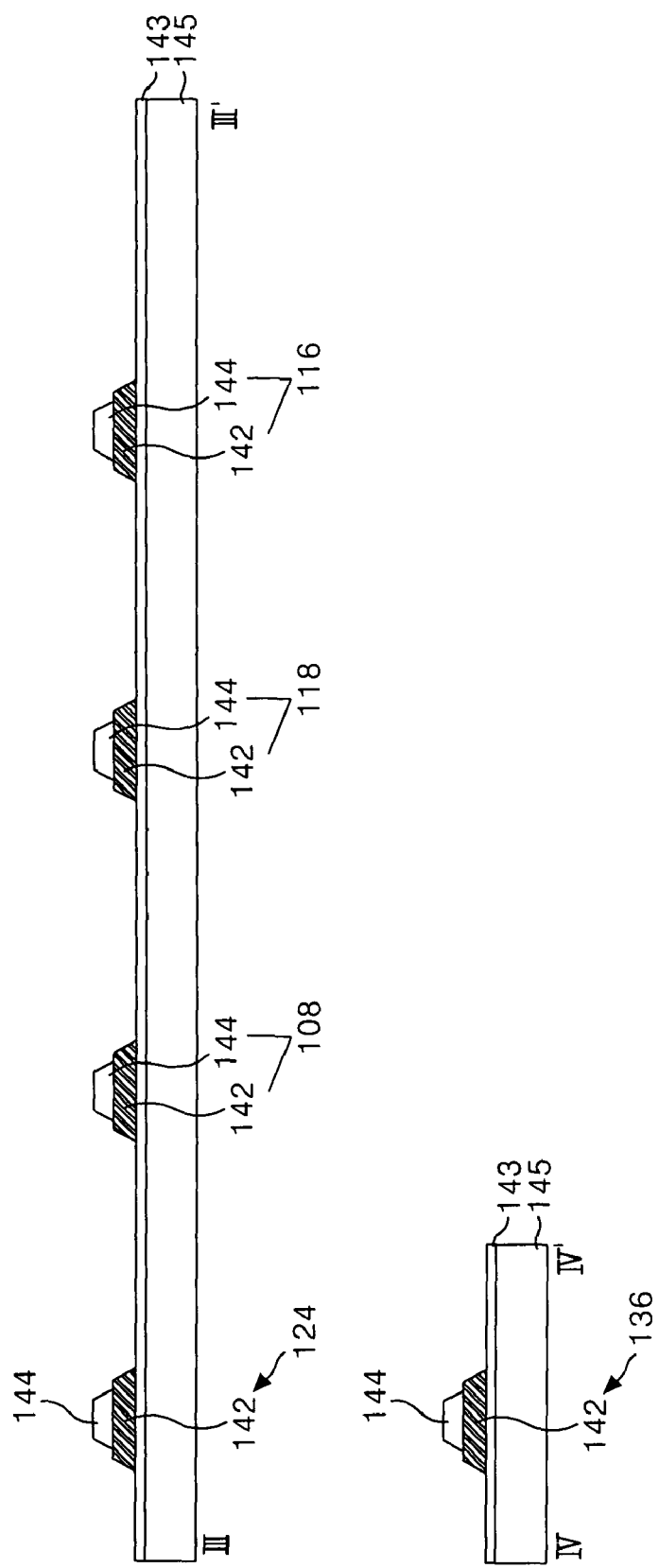

As shown in FIGS. 15A and 15B, the etching preventive layer 143 is formed on the lower substrate and a first conductive pattern group including the gate line 102, the gate line electrode 108, the gate pad 124, the common line 116, the common electrode 118 and the common pad 136 is formed on the etching preventive layer 143 by the first mask process.

More particularly, the etching preventive layer 143 is formed on the lower substrate 145 by a deposition technique such as sputtering, etc. The etching preventive layer 143 is made of transparent oxide system material such as $TiO_2$ or $Al_2O_3$, which is strong against the etchant of hydrofluoric acid HF system.

Subsequently, the first gate metal layer 142 and the second gate metal layer 144 are sequentially deposited via the deposition technique such as the sputtering on the lower substrate 145 with the etching preventive layer 143 to thereby form a gate metal layer of double-layer structure. Then, the gate metal layer is patterned by the photolithography and the etching process using the first mask to thereby provide the first conductive pattern group including the gate line 102, the gate electrode 108, the gate pad 124, the common line 116, the common electrode 118 and the common pad 136. One gate metal layer of the first and the second gate metal layers 142 and 144 is made of any metal that has a relatively high strength and corrosion resistance such as titanium (Ti) and tungsten (W), whereas another gate metal layer is made of any metal such as an aluminum (Al) system metal, molybdenum (Mo) and copper (Cu).

In this connection, in case where the etchant of hydrofluoric acid system is used for patterning the gate metal layer using the metal having a relatively high strength and corrosion resistance, the etching preventive layer 143 serves to protect the lower substrate 145 from the etchant of hydrofluoric acid system. Accordingly, it is possible to prevent the lower substrate 145 from being over-etched by the etchant of hydrofluoric acid system.

Figure 16:
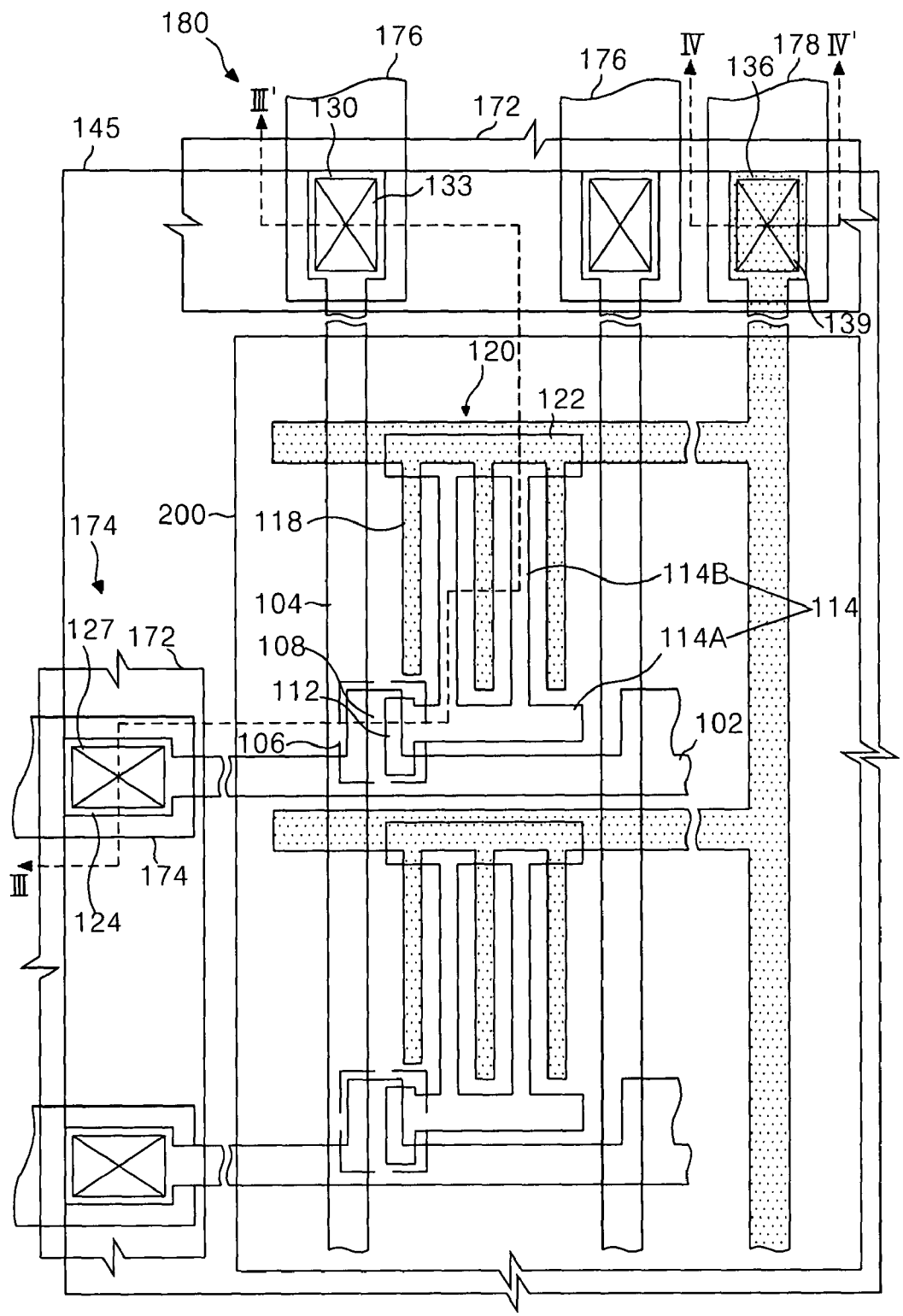
FIG. 16 is a plan view illustrating a liquid crystal display according to the second embodiment of the present invention.
Figure 17:
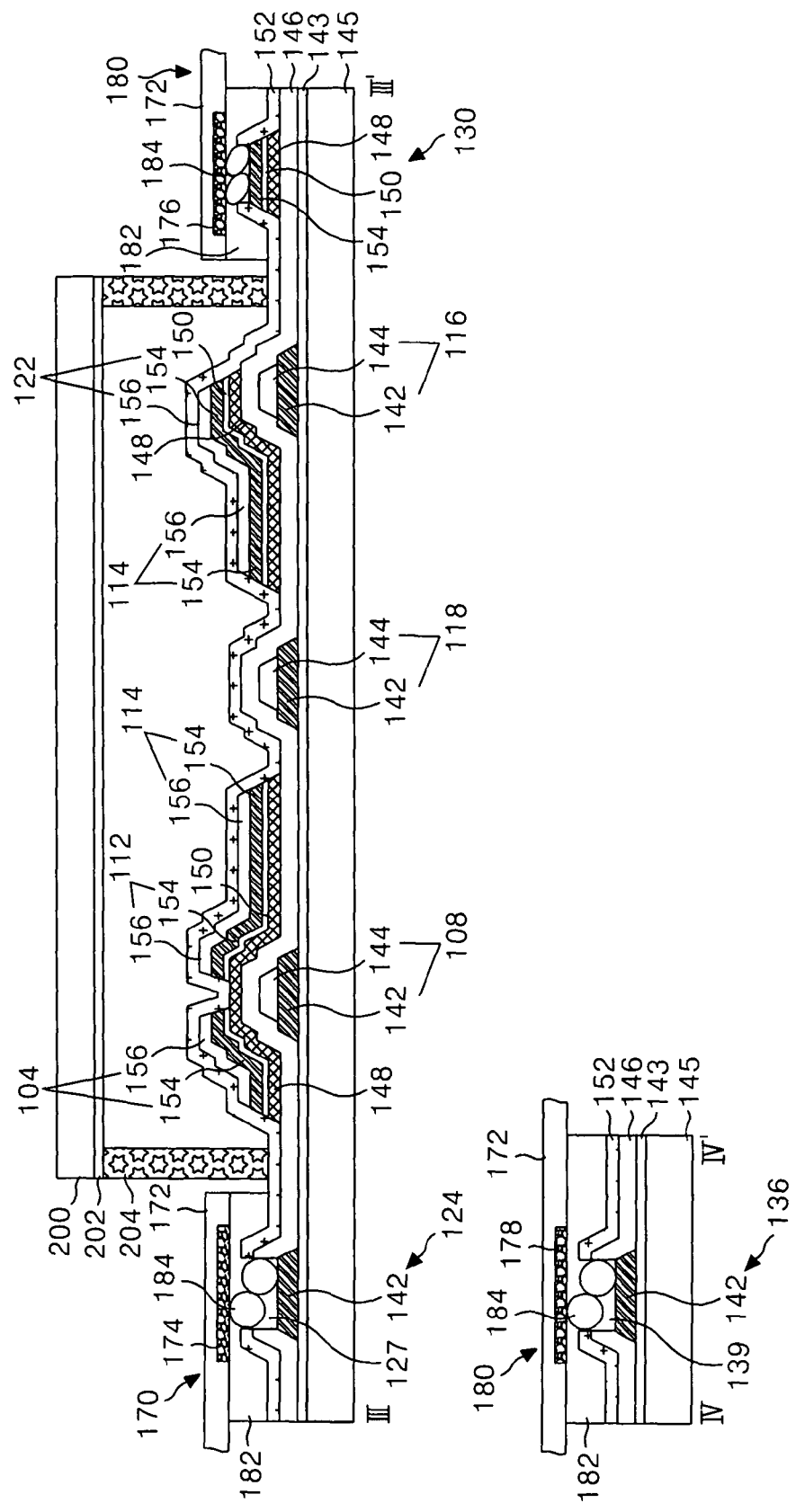
FIG. 17 is a plan view illustrating the liquid crystal display shown in FIG. 16.

On the other hand, the thin film transistor array substrate finished using three-round mask process and a upper substrate of a color filter array 202 manufactured using another process are combined using a sealant 204, as shown in FIGS. 16 and 17, and then a liquid crystal (not shown) is injected therebetween to fabricate a liquid panel. In this case, the upper substrate 200 is combined so as not to overlap with a pad region where the gate pad 124, the data pad 130 and the common pad 136 are formed on the thin film transistor array substrate.

Subsequently, the TCPs 170 and 180 on which drive ICs are mounted are attached using anisotrophic conductive film 182 (ACF) including a conductive ball 184 on a pad region of the thin film transistor array substrate. Accordingly, output pads 174, 176 and 178 formed on the TCPs 170 and 180 are electrically connected to the gate pad 124, the data pad 130 and the common pad 136, respectively, via the conductive ball 184 of the ACF 182. More particularly, a first TCP pad 174 formed on a base film 172 of the gate TCP 170 is electrically connected to the gate pad 124, a second TCP pad 176 formed on the base film 172 of the data TCP 180 is electrically connected to the data pad 130, and a third TCP pad 178 formed on the base film 172 of the data TCP 180 is electrically connected via the common pad 142 and the ACF 182. In this case, the gate pad 124, the data pad 130 and the common pad 136 have a structure in which a metal layer having a high strength and corrosion resistance is exposed as shown FIGS. 10 and 11. Accordingly, although the process of attaching the TCPs is performed repeatedly, there does not occur the defect caused by the opening of the pad.

Figure 18:
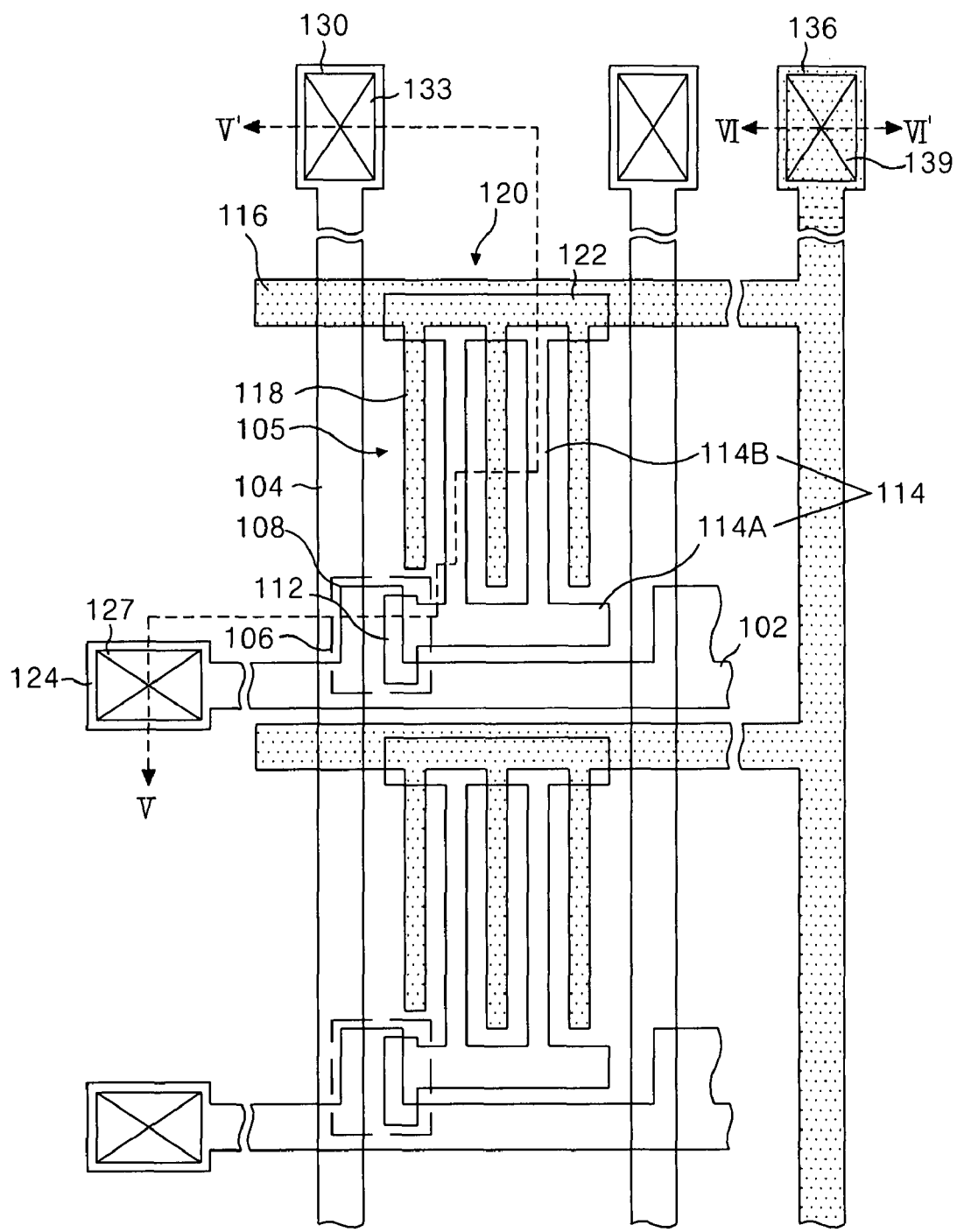
FIG. 18 is plan view illustrating a thin film transistor array substrate among the liquid crystal display of horizontal electric applying type according to a third embodiment of the present invention.
Figure 19:
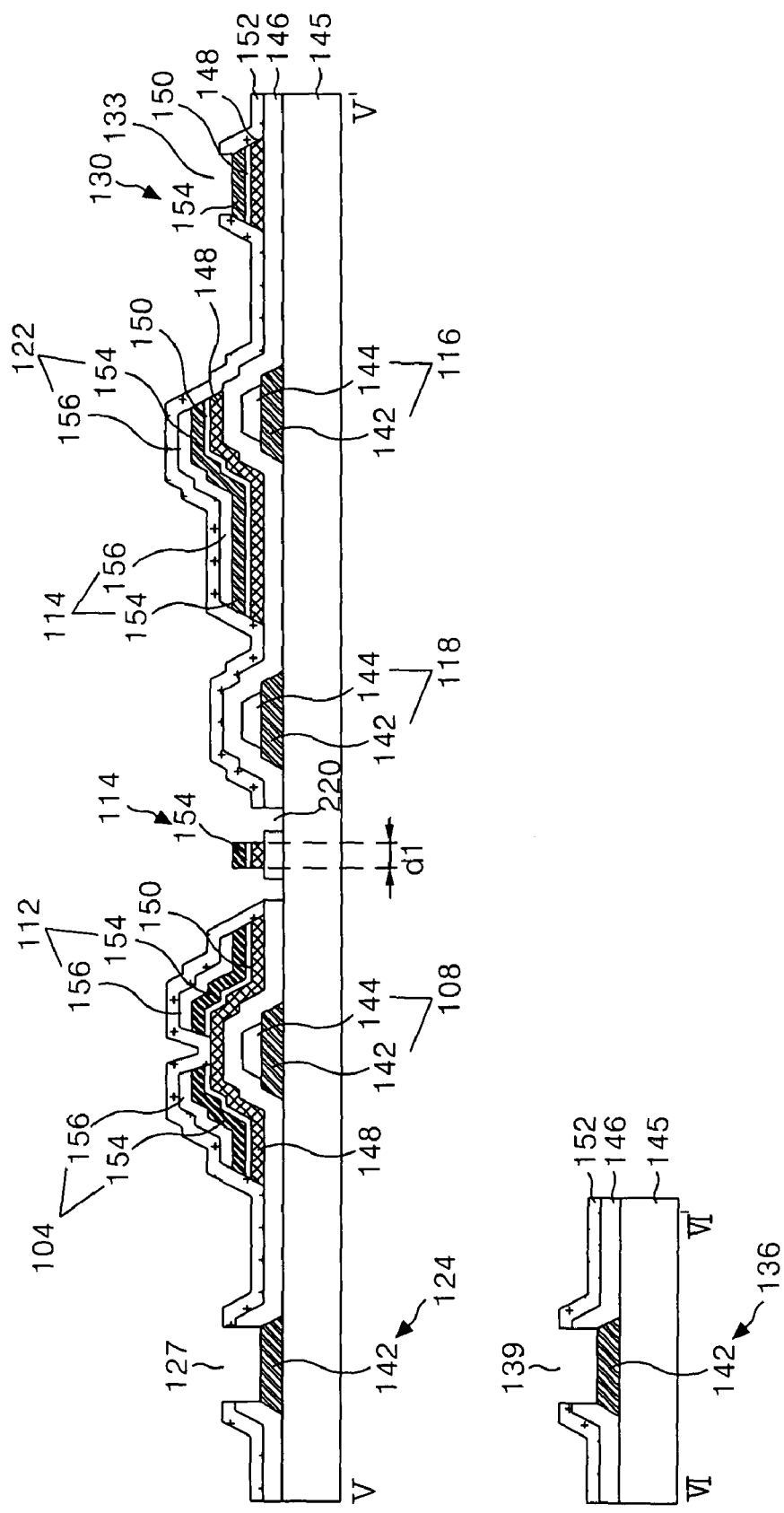
FIG. 19 is a sectional view of the thin film transistor array substrate taken along the lines V-V' and VI-VI' in FIG. 18.

FIG. 18 is plan view illustrating a thin film transistor array substrate of horizontal electric field applying type according to a third embodiment of the present invention and FIG. 19 is a sectional view of the thin film transistor array substrate taken along the lines V-V' and VI-VI' in FIG. 18.

As shown in FIGS. 18 and 19, the thin film transistor array substrate comprises identical elements to those of the thin film transistor array substrate shown in FIGS. 4 and 5 except that a finger part of the pixel electrode and a semiconductor layer are formed to have the same width. Accordingly, the detailed description on the identical elements will be omitted for the sake of simple illustration.

In the thin film transistor according to the third embodiment of the prevent invention, a pixel electrode 114 is formed to have an identical width as that of the semiconductor pattern which includes an active layer 148 and an ohmic contact layer 150 overlapped with the pixel electrode 114. More particularly, a finger part 114B of the pixel electrode 114 and the semiconductor pattern 148 and 150 overlapped with the finger part are formed with same width. This is for preventing the reduction in the size of the aperture region between the finger part 114B of the pixel electrode and the common electrode 118 by the semiconductor patterns 148 and 150 where the semiconductor patterns 148 and 150 located in the lower part of the finger part 114B of the pixel electrode are wider than the finger part 114B.

On the other hand, a fabricating method of the thin film transistor substrate according to the third embodiment of the present invention further includes the step of etching the semiconductor pattern using the pixel electrode as a mask in order to entirely overlap the finger part of the pixel electrode and the semiconductor patterns in comparison with the fabricating method of the thin film transistor according to the first embodiment of the above-mentioned present invention. Accordingly, the first and the second mask processes are the same as described above and therefore the detailed description therefor will be omitted.

FIGS. 20A to 20D are a plan view and a sectional view for explaining a third mask process among a manufacturing method of a thin film transistor array substrate of horizontal electric field applying type according to the third embodiment of the present invention, respectively.

Figure 20A:
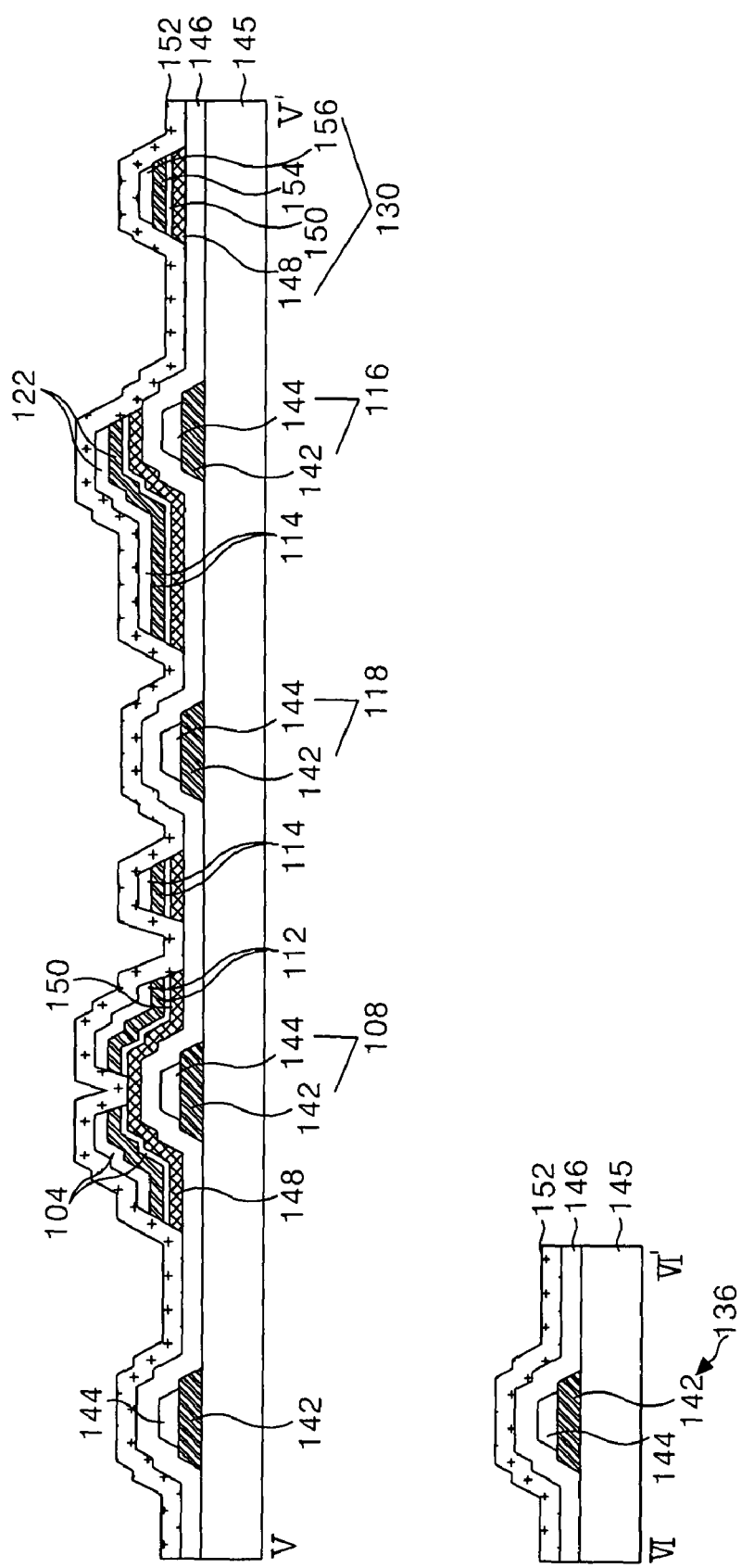
Figure 20C:
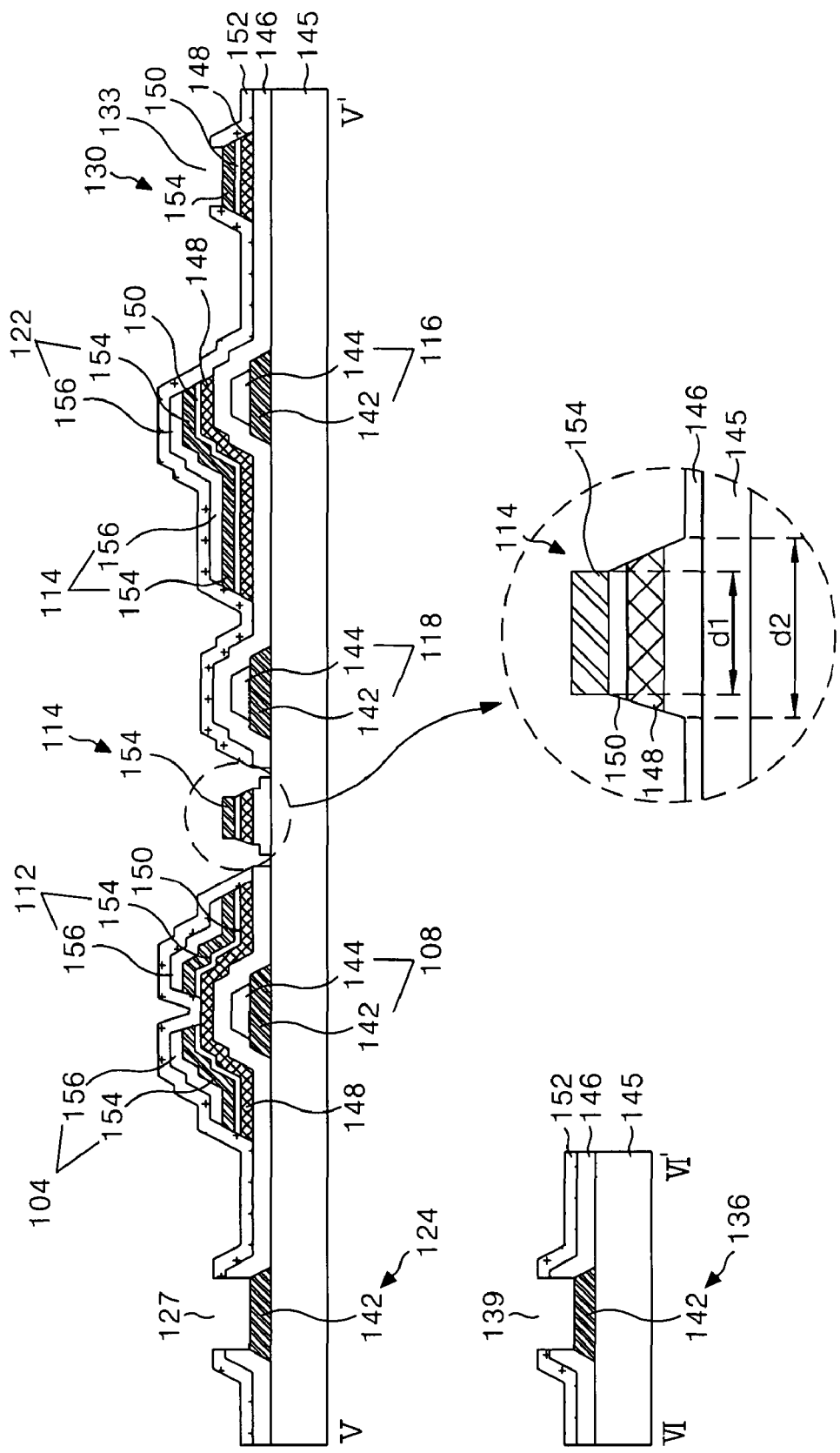

As shown in FIG. 20A, a passivation film 152 is formed by a deposition technique such as the plasma enhanced chemical vapor deposition (PECVD) on the gate insulating film 146 where semiconductor pattern and a source/drain metal pattern are stacked. The passivation film 152 is made of an inorganic material identical to the gate insulating film 146 or an organic material having a low dielectric constant such as an acrylic organic compound, BCB (benzocyclobutene) or PFCB (perfluorocyclobutane). Subsequently, a photo-resist film is entirely formed on the passivation film 152 and then a third mask 210 is arranged on the upper of the lower substrate 145 as shown in FIG. 20B. The third mask 210 comprises a mask substrate 214 that is a transparent material and a cut-off part 212 formed in a cut-off region P2 of the mask substrate 214. Herein, an exposed region of the mask substrate 214 becomes an exposure region P1. The photo-resist film is exposed and developed using the third mask 210 such that the photo-resist pattern 216 is formed in the cut-off region P2 corresponding to the cut-off part 212 of the third mask 210. The passivation film 152 is patterned by the etching process using the photo-resist pattern 216 to thereby form a first to a third contact holes 127, 133 and 139 and a through hole 220 as shown in FIG. 20C.

The first contact hole 127 is formed in such a manner as to pass through the passivation film 152 and the gate insulating film 146 and expose a gate pad 124, the second contact hole 133 is formed in such a manner as to pass through the passivation film 152 and expose a data pad 130 and the third contact hole 139 is formed in such a manner as to pass through the passivation film 152 and the gate insulating film 146 and expose a common pad 136. The exposed gate pad 124, the data pad 130 and the common pad 136 have the structure in which a metal layer having a high strength and corrosion resistance is exposed.

The through hole 220 passing through the passivation film 152 and the gate insulating film 146 to thereby overlap with a pixel electrode 114 having a first width d1 and the pixel electrode 114 and expose the gate insulating film 146 and the semiconductor pattern including an ohmic contact layer 150 and a active layer 148 having a second width d2 that is relatively wider than the pixel electrode 114. At this time, the width d2 of the exposed semiconductor patterns 148 and 150 is, for example, about 6 μm~6.5 μm, and the width d1 of the pixel electrode is about 3 μm~3.5 cm.

Figure 20D:
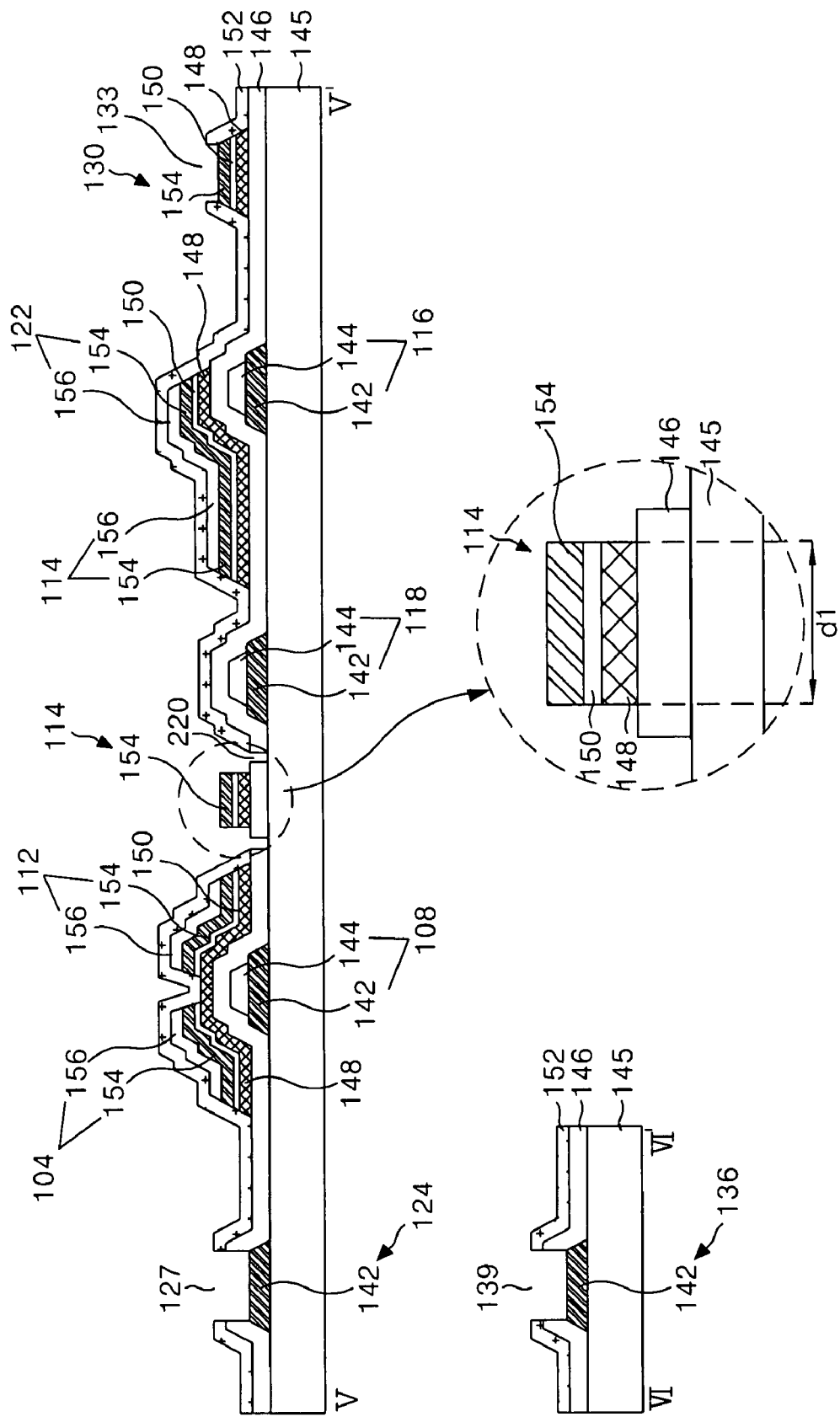

Subsequently, the semiconductor pattern 148 and 150 are dry etched using the exposed pixel electrode 114 as a mask such that the pixel electrode 114 and the semiconductor pattern 148 and 150 have a first width identical to each other and are entirely overlapped with each other as shown in FIG. 20D. For instance, the pixel electrode 114 and the semiconductor pattern 148 and 150 which are entirely overlapped have about 3 μm width.

Figure 21:
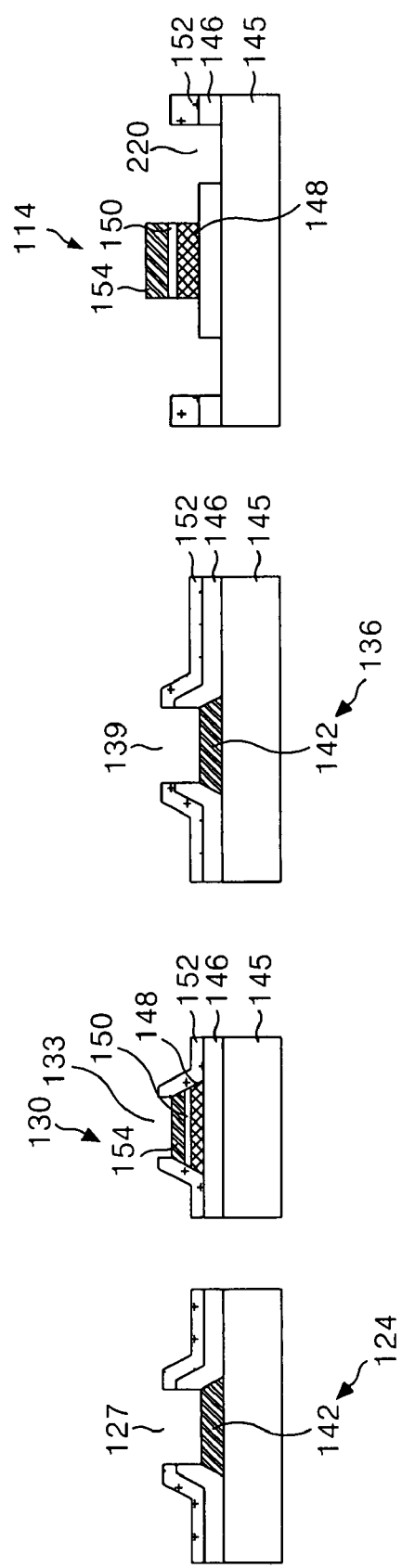
FIG. 21 is a sectional view illustrating a pixel electrode and pads of a first structure in the thin film transistor substrate according to the third embodiment of the present invention.
Figure 22:
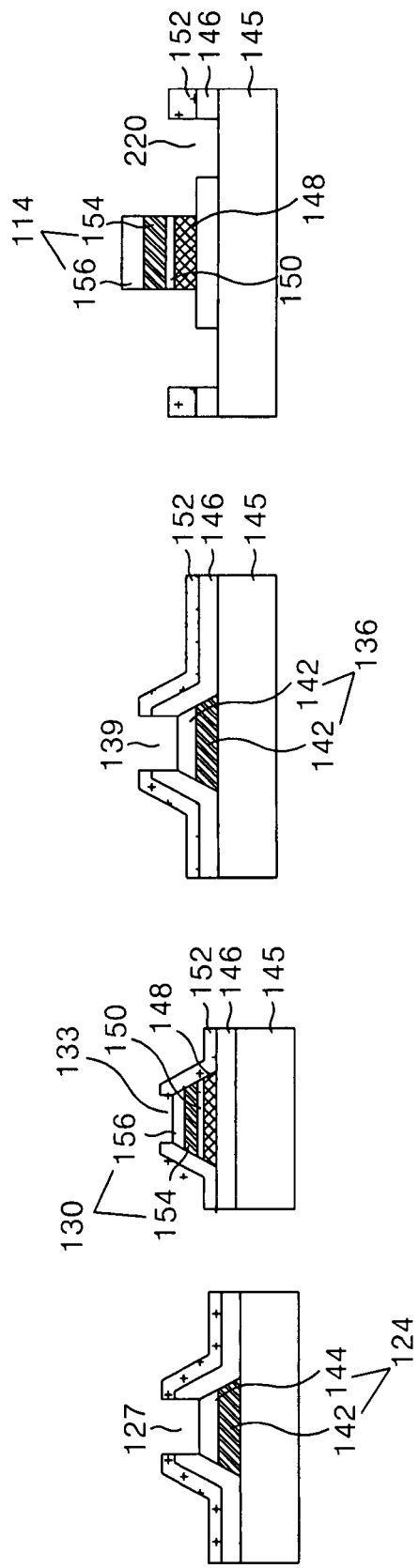
FIG. 22 is a sectional view illustrating the pixel electrode and pads of a second structure in the thin film transistor substrate according to the third embodiment of the present invention.

On the other hand, the exposed gate pad 124, the data pad 130, the common pad 136 and the pixel electrode 114 have two structures by the third mask process as shown in FIGS. 21 and 22.

For instance, where the first gate metal layer 142 of the lower portion is made of titanium Ti and a second gate metal layer 144 is made of molybdenum Mo, the gate pad 124 and the common pad 136 consist only of the first gate metal layer 142 of the lower portion as shown in FIG. 21. It is because the second gate metal layer 144 is removed for the etching process to form the first and the third contact holes 127 and 139.

On the contrary, where the first gate metal layer 142 of the lower portion is made of molybdenum Mo and the second gate metal layer 144 of the upper portion is made of titanium Ti, the gate pad 124 and the common pad 136 have the double-layer of metal layers where the first and the second gate metal layers 142 and 144 are stacked as shown in FIG. 22. Also, the gate pad 124 and the common pad 136 have the structure in which the second gate metal layer 144 of the upper portion is exposed by the first and the third contact holes 127 and 139.

Further, where the first source/drain metal layer 154 of lower portion is made of titanium Ti and the second source/drain metal layer 156 of upper portion is made of molybdenum Mo, the data pad 130 and the pixel electrode 114 consist of only the first source/drain metal layer 154 of the lower portion as shown in FIG. 21. It is because the second source/drain metal layer 156 is removed for the etching process to form the second contact hole 133.

On the contrary, in case where the first source/drain metal layer 154 of the lower portion is made of molybdenum Mo and the second source/drain metal layer 156 is made of titanium Ti, the data pad 130 and the pixel electrode 114 have the double-layer metal layer structure in which the first and the second source/drain metal layers 154 and 156 are stacked as shown in FIG. 22. Also, the data pad 130 has the structure wherein the second source/drain metal layer 156 of the upper portion is exposed by the second contact hole 133, while the pixel electrode 114 has the structure wherein the second source/drain metal layer 156 of the upper portion is exposed by the through hole 220.

As described above, in the thin film transistor array substrate of horizontal electric field applying type and the fabricating method thereof according to the present invention, the pixel electrode 114 is formed as an identical metal to the drain electrode 112. Further, the pixel electrode 114 and the semiconductor patterns 148 and 150 are entirely overlapped to thereby prevent the deterioration of aperture ratio by the semiconductor patterns 148 and 150.

Further, the gate pad 124, the data pad 130 and the common pad 136 are made of any metals that have a high strength and corrosion resistance, which is capable of preventing the defect caused by the opening in the repeatedly attaching process of TCP. Accordingly, a transparent conductive film is not needed in the present invention, that is, a transparent conductive film deposition and patterning process are not needed, which reduces one mask process. In other words, the thin film transistor array substrate of horizontal electric field applying type according to the present invention is achieved by using the three-round mask process.

Figure 23:
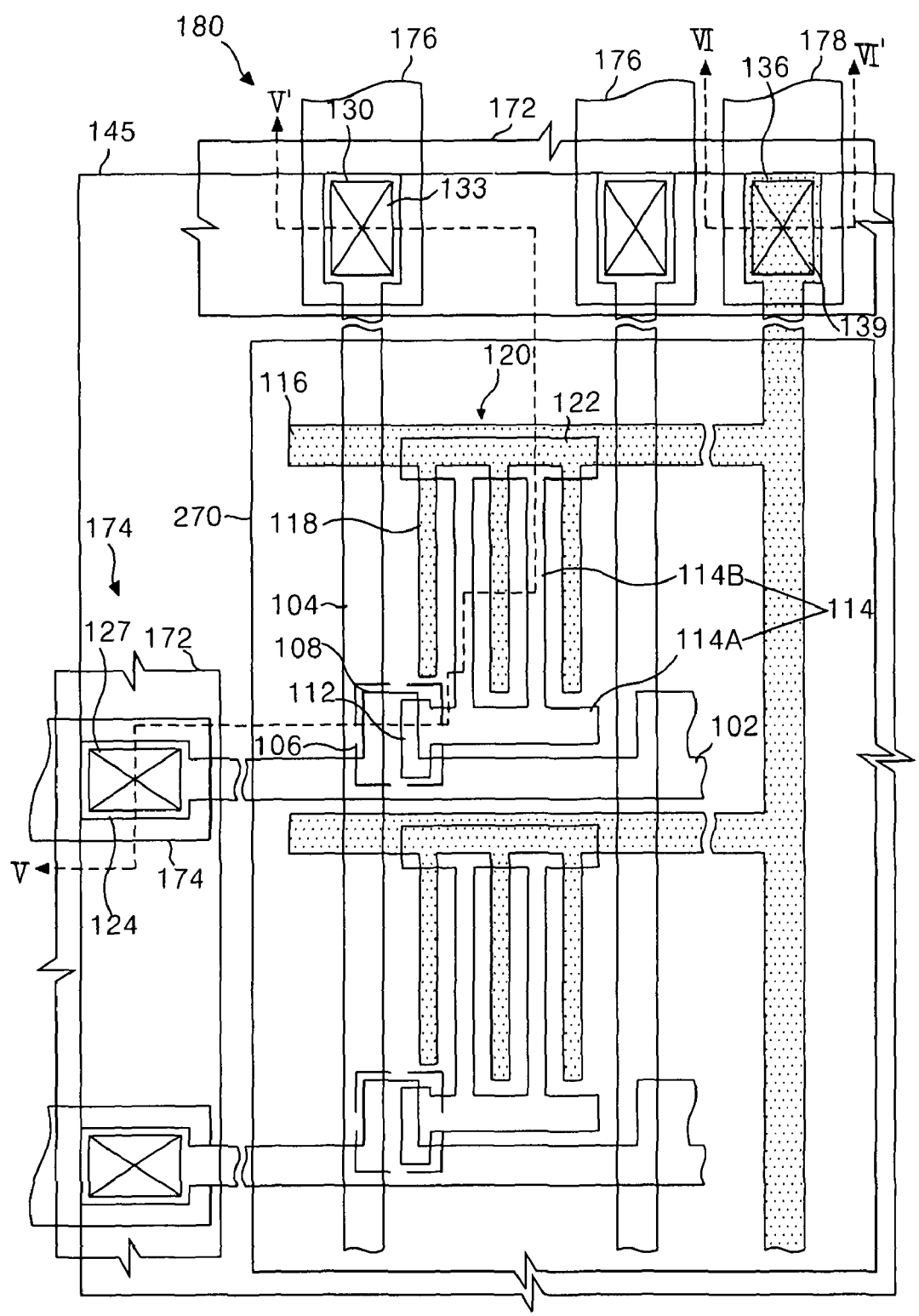
FIG. 23 is a plan view illustrating a liquid crystal display according to the third embodiment of the present invention.
Figure 24:
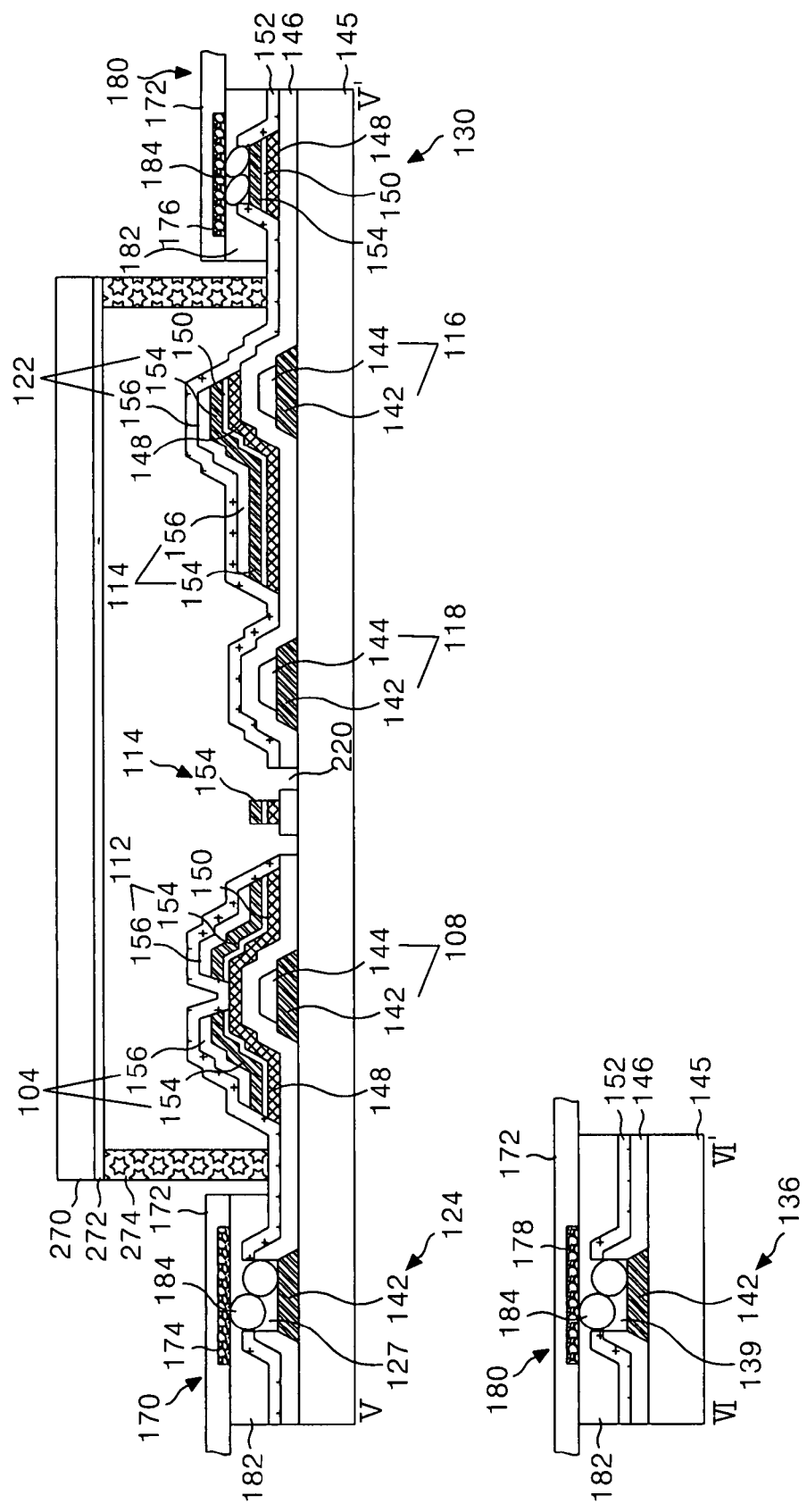
FIG. 24 is a plan view showing the liquid crystal display shown in FIG. 23.

The finished thin film transistor array substrate and a upper substrate 207 of a color filter array 272 manufactured using another process are combined using a sealant 204 and then a liquid crystal (not shown) is injected therebetween, to thereby fabricate a liquid panel as shown FIGS. 23 and 24. In this case, the upper substrate 270 is combined not to be overlapped with a pad region where the gate pad 124, the data pad 130 and the common pad 136 are formed on the thin film transistor array substrate.

Subsequently, the TCPs 170 and 180 wherein drive ICs are mounted are attached with each other using anisotrophic conductive film 182 (ACF) including a conductive ball 184 on a pad region of the thin film transistor array substrate. Accordingly, the output pads 174, 176 and 178 formed on the TCPs 170 and 180 are electrically connected to the gate pad 124, the data pad 130 and the common pad 136, respectively, via the conductive ball 184 of the ACF 182. More particularly, a first TCP pad 174 formed on a base film 172 of the gate TCP 170 is electrically connected to the gate pad 124, a second TCP pad 176 formed on the base film 172 of the data TCP 180 is electrically connected to the data pad 130 and a third TCP pad 178 formed on the base film 172 of the data TCP 180 is electrically connected via the first gate metal layer 142 of the common pad 136 and the ACF 182. In this case, the gate pad 124, the data pad 130 and the common pad 136 have the structure wherein a metal layer having a high strength and corrosion resistance is exposed such that the defect caused by the opening of the pad is prevented even through the process of attaching the TCPs 170 and 180 is performed repeatedly.

As described above, in the thin film transistor array substrate of horizontal electric field applying type and manufacturing method thereof according to the present invention, the pixel electrode is formed as an identical metal to the drain electrode, and the pads have the structure that a metal layer having a high strength and corrosion resistance is exposed in order to prevent the defect caused by the opening and are connected to the TCP via the ACF. Accordingly, the transparent conductive film is not needed in the thin film transistor array substrate of horizontal electric field applying type and fabricating method thereof according to the present invention, that is, the transparent conductive film deposition and patterning process are not needed, to thereby reduce one mask process.

Further, according to the thin film transistor array substrate of horizontal electric applying type and the fabricating method thereof according to the present invention, it is possible to prevent the substrate from being damaged by the etchant of hydrofluoric acid HF system employed to pattern a metal layer having a high strength and corrosion resistance using the etching preventive layer used to protect the substrate.

Moreover, the thin film transistor array substrate of horizontal electric applying type and manufacturing method thereof according to the present invention is entirely overlapped the finger part of the pixel electrode and the semiconductor pattern located at the lower portion. Accordingly, in the thin film transistor array substrate of the horizontal electric field applying type and the fabricating method thereof according to the present invention, it is possible to prevent the deterioration of aperture ratio by the semiconductor pattern having the width of the finger part of the pixel electrode.

As the result, according to the thin film transistor array substrate of horizontal electric field applying type and the fabricating method thereof according to the present invention, it is possible to manufacture the thin film transistor array substrate using the three-round mask process and therefore to simplify the structure and processes the thin film transistor array substrate and to reduce the manufacturing cost and improve the manufacture yield.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display of horizontal electric field applying type, which includes:
   preparing a thin film transistor array substrate, wherein the thin film transistor array substrate includes a thin film transistor formed on a crossing of a gate line and a data line, a pixel electrode connected to the thin film transistor, a common electrode producing horizontal electric field along with the pixel electrode, a common line connected to the common electrode, a gate pad formed with at least one conductive layer of the gate line, a data pad formed with at least one conductive layer of the data line, and a common pad formed with at least one conductive layer of the common line;

preparing a color filter array substrate to be opposite to the thin film transistor array substrate;

combining the thin film array substrate and the color filter array substrate; and directly connecting a conductive film to the gate pad, the data pad and the common pad, wherein the step of preparing a thin film transistor array substrate includes:

forming a first metal layer on a substrate;

forming a first conductive pattern group having the gate line, a gate electrode of the thin film transistor, the common line parallel to the gate line, the common electrode, the gate pad and the common pad, by patterning the first metal layer;

forming a gate insulating film on the substrate having the first conductive pattern group thereon;

forming a semiconductor layer and a second metal layer on the gate insulating film;

forming a semiconductor pattern group including an active layer having a channel of the thin film transistor and an ohmic contact layer between source and drain electrodes of the thin film transistor and the active layer, and a second conductive pattern group including the data line, a source electrode of the thin film transistor connected to the data line, a drain electrode of the thin film transistor being opposite to the source electrode, a pixel electrode connected to the drain electrode and paralleled to the common electrode and the data pad, by patterning semiconductor layer and the second metal layer; and forming a passivation film on the gate insulation film having the second conductive pattern group and the semiconductor pattern group formed thereon.

2. The method of claim 1, wherein any one of the first and the second metal layers is formed to have a double-layer structure having a main conductive layer and a subsidiary conductive layer for providing against the opening of the main conductive layer.

3. The method of claim 2, wherein the step of forming the passivation film includes forming a contact hole passing through the passivation film and the gate insulation film to expose the subsidiary conductive layers of the gate pad and the common pad.

4. The method of claim 2, wherein the step of forming the passivation film includes forming a contact hole passing through the passivation film, the gate insulation film and the main conductive layers of the gate pad and the common pad to expose the subsidiary conductive layers of the gate pad and the common pad.

5. The method of claim 2, wherein the step of forming the passivation film includes forming a contact hole passing through the passivation film to expose the subsidiary conductive layer of the data pad.

6. The method of claim 2, wherein the step of forming the passivation film includes forming a contact hole passing through the passivation film and the main layer to expose a subsidiary layer of the data pad.

7. The method of claim 2, wherein the main layer includes at least one of an aluminum system metal, a copper, a molybdenum, a chrome and a tungsten which are a low resistance metal, and wherein the subsidiary layer includes a titanium.

8. The method of claim 1, wherein the second conductive pattern group further includes an upper storage electrode overlapped with the common line with the gate insulating film therebetween.

9. The method of claim 1, wherein the step of preparing the thin film transistor array substrate further includes:

preparing the substrate; and forming an etching preventive layer on the substrate.

10. The method of claim 9, wherein the etching preventive layer includes a transparent oxide system material.

11. The method of claim 10, wherein the etching preventive layer includes any one of $TiO_2$ and $Al_2O_3$.

12. A method for fabricating a liquid crystal display of horizontal electric field applying type, which includes:

preparing a thin film transistor array substrate, wherein the thin film transistor array substrate includes a thin film transistor formed on a crossing of a gate line and a data line, a pixel electrode connected to the thin film transistor, a common electrode producing horizontal electric field along with the pixel electrode, a common line connected to the common electrode, a gate pad formed with at least one conductive layer of the gate line, a datapad formed with at least one conductive layer of the data line, and a common pad formed with at least one conductive layer of the common line;

preparing a color filter array substrate to be opposite to the thin film transistor array substrate;

combining the thin film array substrate and the color filter array substrate; and directly connecting a conductive film to the gate pad, the data pad and the common pad, wherein said step of preparing the thin film transistor array substrate includes:

forming a first metal layer on a substrate;

forming a first conductive pattern group having the gate line, a gate electrode of the thin film transistor connected to the gate line, the common line parallel to the gate line, the common electrode, the gate pad and the common pad, by patterning the first metal layer;

forming a semiconductor layer and a second metal layer on the gate insulating film;

forming a gate insulating film on the substrate having the first conductive pattern group thereon;

forming a semiconductor pattern group including an active layer having a channel of the thin film transistor and an ohmic contact layer between drain electrodes of the thin film transistor and the active layer, and a second conductive pattern group including the data line, a source electrode of the thin film transistor connected to the data line, a drain electrode of the thin film transistor opposite to the source electrode, a pixel electrode formed with at least one conductive layer of the drain electrode and having a finger part to form a horizontal electric field along with the common electrode, and the data pad, by patterning semiconductor layer and the second metal layer;

forming a passivation film on the gate insulating film so as to cover the semiconductor layer and the second conductive pattern group; and patterning the semiconductor layer so that the finger part of the pixel electrode is formed to have a width identical to that of the pixel electrode.

13. The method of claim 12, wherein the second conductive pattern groups is formed to have a double-layer structure having a main conductive layer and a subsidiary conductive layer for providing against the opening of the main conductive layer, wherein the step of forming the passivation film includes:

forming a contact hole passing through the passivation film to expose the subsidiary conductive layer of the data pad, and forming a through hole passing through the passivation film and the gate insulating film around the pixel electrode to expose the subsidiary conductive layer of the pixel electrode and the semiconductor layer of the pixel electrode having greater width than that of the subsidiary conductive layer of the pixel electrode.

14. The method of claim 2, wherein the step of forming the passivation film includes:

forming a contact hole passing through the passivation film and the main conductive layer to expose the subsidiary conductive layer of the data pad, and forming a through hole passing through the passivation film, the gate insulating film and the main conductive layer around the pixel electrode to expose the subsidiary conductive layer of the pixel electrode and the semiconductor layer of the pixel electrode having greater width than that of the subsidiary conductive layer of the pixel electrode.

15. The method of claim 12, wherein the step of forming the semiconductor pattern group and the second conductive pattern group includes dry-etching the semiconductor layer the pixel electrode as the mask.

* * * * *